United States Patent
Wakabayashi et al.

(10) Patent No.: US 6,947,413 B2
(45) Date of Patent: Sep. 20, 2005

(54) SWITCHING APPARATUS, COMMUNICATION APPARATUS, AND COMMUNICATION SYSTEM

(75) Inventors: Tetsuaki Wakabayashi, Kawasaki (JP); Kenichi Okabe, Kawasaki (JP); Shiro Uriu, Kawasaki (JP); Hiroshi Tomonaga, Kawasaki (JP); Naoki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 919 days.

(21) Appl. No.: 09/942,314

(22) Filed: Aug. 29, 2001

(65) Prior Publication Data

US 2002/0031092 A1 Mar. 14, 2002

(30) Foreign Application Priority Data

Sep. 11, 2000 (JP) .................................. 2000-275316
Jun. 28, 2001 (JP) .................................. 2001-196919

(51) Int. Cl.[7] ........................................... H04L 12/28
(52) U.S. Cl. ..................... 370/358; 370/369; 370/392
(58) Field of Search ................................. 370/352, 359, 370/380, 392, 388–390, 369

(56) References Cited

U.S. PATENT DOCUMENTS

| | | | | |
|---|---|---|---|---|
| 4,536,870 A | * | 8/1985 | Bovo et al. ................. | 370/220 |
| 4,993,018 A | * | 2/1991 | Hajikano et al. ........... | 370/392 |
| 5,499,239 A | * | 3/1996 | Munter ....................... | 370/423 |
| 5,513,177 A | * | 4/1996 | Sakurai et al. .............. | 370/369 |
| 5,555,243 A | * | 9/1996 | Kakuma et al. ............ | 370/388 |
| 5,936,958 A | * | 8/1999 | Soumiya et al. ............ | 370/389 |
| 6,115,373 A | | 9/2000 | Lea | |
| 6,188,686 B1 | * | 2/2001 | Smith ......................... | 370/388 |
| 6,724,760 B2 | * | 4/2004 | Uchida ....................... | 370/390 |

FOREIGN PATENT DOCUMENTS

| | | |
|---|---|---|
| EP | 0 915 593 | 5/1999 |
| GB | 2 316 572 | 2/1998 |
| JP | 8-79253 | 3/1996 |
| JP | 8-509339 | 10/1996 |
| JP | 10-233781 | 9/1998 |

OTHER PUBLICATIONS

European Search Report dated Mar. 4, 2004.
Parulkar G et al. AITPM: A Strategy for Integrating IP with ATM. Computer Communication Review, Association for Computing Machinery, vol. 25, No. 4 Oct. 1, 1995 pp. 49–58.
Wen De Zhong, et al., "Design Requirements and Architectures for Multicast ATM Switching" IEICE Transactions on Communications, vol. E77–B, No. 11: Nov. 1994; XP000504589; ISSN: 0916–8516, pp. 1420–1428.
Chong–Kwon Kim, "Performance Analysis of a Duplex Multicast Switch" IEEE Transactions on Communications; vol. 40, No. 10 Oct. 1992: XP000331095; ISSN: 0090–6778, pp. 1615–1624.
Lee, et al., "Broadband Packet Switches Based on Dilated Interconnection Networks" IEEE Transactions on Communication; vol. 42, No. 2,3,4 Feb. 1994; XP000491643; ISSN: 0090–6778, pp. 732–744.
Takagi, et al., "Batcher Banyan Network with Cell Copy Preparation Stages for Multicast Switching" IEEE International Conference on ATM; Jun. 22–24, 1998 XP010290993; ISSN: 0–7803–4982–2, pp. 155–161.

* cited by examiner

*Primary Examiner*—Duc Ho
*Assistant Examiner*—Phuongchau Ba Nguyen
(74) *Attorney, Agent, or Firm*—Katten Muchin Rosenman

(57) ABSTRACT

A switching apparatus that is used for high-speed large-capacity routing and a communication apparatus and communication system that are used for an efficient recursive multicast. A matrix switch performs self-routing on a packet on the basis of a tag including output route information set in the packet. Selectors are located so as to correspond to N output ports P#1 through P#N of the matrix switch and perform N-to-one selection control. Setting registers hold selection information used by the selectors to select a signal.

22 Claims, 24 Drawing Sheets

FIG. 19

T3 TIME MANAGEMENT TABLE

| | T3a MULTICAST TARGET LINE FLAG 0 ~ 7 ~ 82 ~ 87 88 ~ N-1 | T3b LAST PID REFERENCE TIME | T3c REQUEST TIME FOR MULTICAST CHANGE (tc) | T3d NUMBER OF REDUCED LINES (K) | T3e MULTICAST TREE FALLING OFF TARGET LINE FLAG 0 ~ 81 82 83 ~ N-1 |
|---|---|---|---|---|---|
| PID | 0 ~ 0 1 ~ 1 1 0 ~ 0 | 0 | 10 | 1 | 0 ~ 0 1 0 ~ 0 |
| | ----- | ----- | ----- | ----- | ----- |

R1 CURRENT TIME SETTING REGISTER
5000

R2 TIME SETTING REGISTER FOR STORING LOOPBACK TIME PER LINE tloop
4996

FIG. 23

T4 MULTICAST SETTING TABLE

| UEN (ONE BIT) | USP (ONE BIT) | DEN (ONE BIT) |
|---|---|---|
| -------- | -------- | -------- |

PID

SWITCHING APPARATUS, COMMUNICATION APPARATUS, AND COMMUNICATION SYSTEM

BACKGROUND OF THE INVENTION (1) Field of the Invention

This invention relates to a switching apparatus, communication apparatus, and communication system and, more particularly, to a switching apparatus for routing a packet, communication apparatus for performing multicast communication, and communication system for accommodating many lines and controlling communication.

(2) Description of the Related Art

With the rapid spread of the Internet, there has been a sharp increase in demand for efficient large-capacity IP (internet protocol) traffic in recent years. Therefore, it is hoped that a high-speed large-capacity routing apparatus will be realized.

If multicast communication, for example, is performed, a routing apparatus will copy a packet when it selects a transfer route to a destination address on a network.

With a conventional technique for copying a packet, a received packet is temporarily stored in a buffer at first. Then a routing table prepared in advance is searched for an output route with an identifier in the packet as a key. And then reading from the buffer is performed according to output route information obtained. As a result, one packet is sent to a plurality of output routes.

However, a routing apparatus which uses the conventional technique for copying a packet described above will need to accommodate a huge number of lines when it handles large-capacity traffic at high speed, resulting in a huge number of queues used according to packet types and output routes and in a large-scale routing table.

On the other hand, routing an IP frame will need not packet-by-packet processing but frame-conscious processing because a variable-length frame is input.

In other words, with packet-by-packet processing on an ATM fixed-length packet (cell), reversion of the order of sending may occur at the time of routing because a destination address for a cell is specified from the very first. Cells can be treated independently of one another.

With IP traffic, however, when a variable-length frame is divided into fixed-length packets and routed, the order of the packets at the time of the division must be guaranteed. Packets therefore cannot be treated independently of one another.

As described above, when a process, such as a multicast, is performed on IP traffic, a variable-length frame is divided into fixed-length packets in an apparatus. Therefore, the continuity of packets at the time of generating a frame must be guaranteed at the time of writing to and reading from a buffer. Furthermore, the conventional technique will make address management in a buffer extremely complicated if multicast communication, for example, is also taken into consideration. This will interfere with high-speed processing.

SUMMARY OF THE INVENTION

An object of the present invention is to provide a switching apparatus for performing high-speed large-capacity routing.

Another object of the present invention is to provide a communication apparatus for performing an efficient recursive multicast.

Still another object of the present invention is to provide a communication system for performing high-speed large-capacity routing and an efficient recursive multicast.

In order to achieve the above objects, a switching apparatus for routing a packet is provided. This switching apparatus comprises a matrix switch for performing self-routing on a packet on the basis of a tag including output route information set in the packet and a packet copying section including N-to-one selectors located so as to correspond to N output ports of the matrix switch and setting registers for holding selection information used by the selectors to select a signal.

Another object of the present invention is to provide a communication apparatus for performing packet communication. This communication apparatus comprises an input line interface section including multicast information giving means for dividing a variable-length frame input into a plurality of fixed-length packets and for giving multicast identification information to the effect that a multicast is performed only to the leading packet as multicast information in the case of multicasting the frame, packet selecting means for selecting one of a packet from the input line side and a packet which loops back, and tag converting means for recognizing the multicast identification information for a selected packet, making a search for an output route, and converting a tag including output route information and an output line interface section including scheduling processing means for performing scheduling to guarantee the continuity of a frame and for writing a packet to and reading a packet from a packet buffer which stores packets, loopback means for causing a packet read from the packet buffer to loop back to the input line interface section, and packet combining means for combining packets into a frame and outputting the frame from an appropriate output route.

Still another object of the present invention is to provide a communication system for accommodating many lines and controlling communication. This communication system comprises an input line interface section including multicast information giving means for dividing a variable-length frame input into a plurality of fixed-length packets and for giving multicast identification information to the effect that a multicast is performed only to the leading packet as multicast information in the case of multicasting the frame, packet selecting means for selecting one of a packet from the input line side and a packet which loops back, and tag converting means for recognizing the multicast identification information for a selected packet, making a search for an output route, and converting a tag including output route information, a switching section including a matrix switch for performing self-routing on a packet on the basis of the tag and a packet copying section including N-to-one selectors located so as to correspond to N output ports of the matrix switch and setting registers for holding selection information being necessary for the selectors to select a signal, and an output line interface section including scheduling processing means for performing scheduling to guarantee the continuity of a frame and for writing a packet to and reading a packet from a packet buffer which stores packets output from the switching section, loopback means for causing a packet read from the packet buffer to loop back to the input line interface section, and packet combining means for combining packets into a frame and outputting the frame from an appropriate output route.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 19 is a view showing a time management table and time setting register.

FIG. 23 is a view showing a multicast setting table.

DESCRIPTION OF THE PREFERRED EMBODIMENTS

Figure 1:
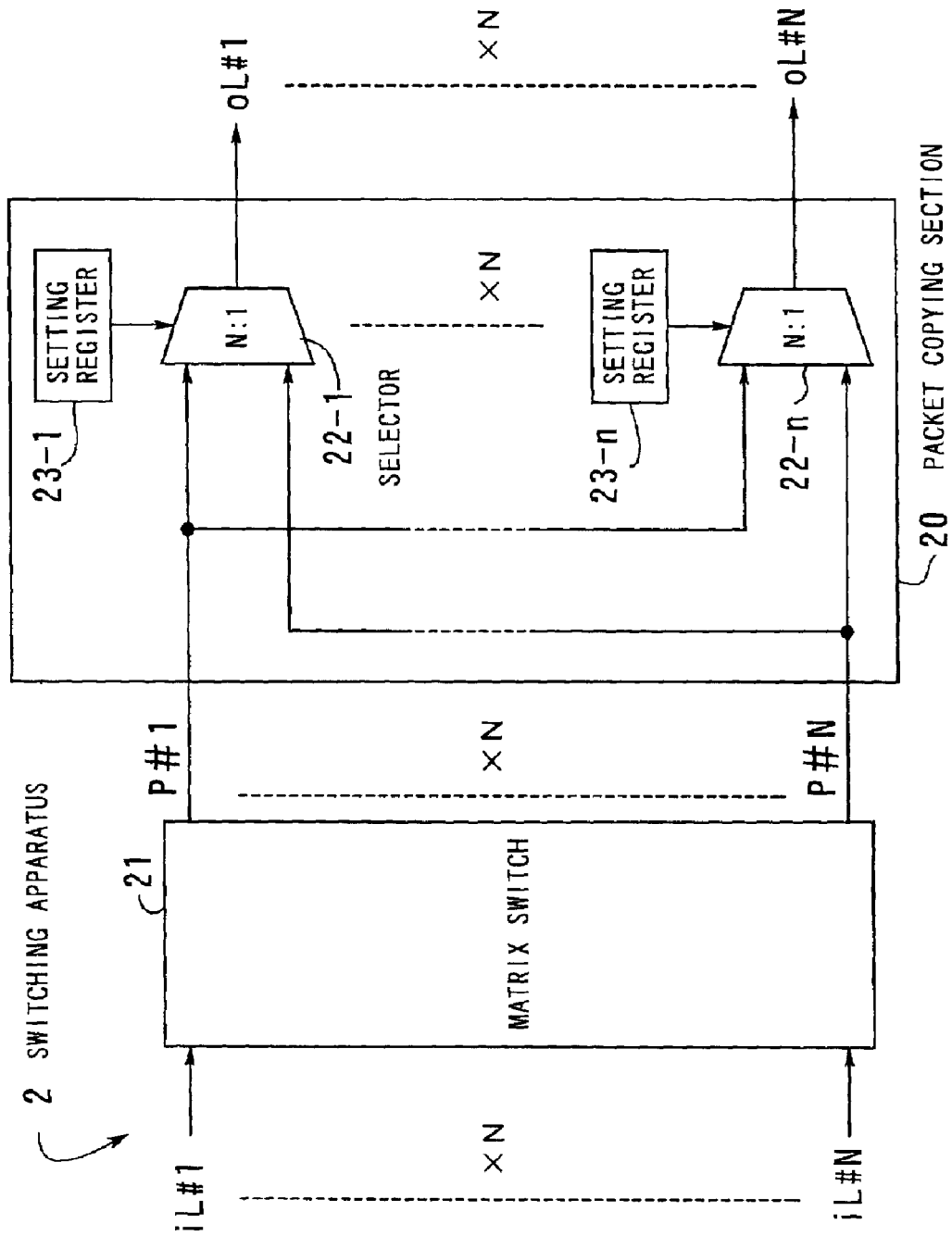
FIG. 1 is a view for describing the principles underlying a switching apparatus according to the present invention.

Embodiments of the present invention will now be described with reference to the drawings. FIG. 1 is a view for describing the principles underlying a switching apparatus according to the present invention. A switching apparatus 2 comprises a matrix switch 21 and a packet copying section 20 and routes a packet.

The matrix switch 21 is one like an N×N matrix, is connected to N input lines iL#1 through iL#N, and has N output ports P#1 through P#N.

The matrix switch 21 performs self-routing on input packets sent from input lines iL#1 through iL#N on the basis of tags including output route information (showing one output destination to which a packet should be directed) set in the packets and outputs the packets from appropriate ports P#1 through P#N.

The packet copying section 20 comprises selectors 22-1 through 22-n and setting registers 23-1 through 23-n. The selectors 22-1 through 22-n are located so as to correspond to N output ports P#1 through P#N of the matrix switch 21. The ratio of the number of input to the number of output of the selectors 22-1 through 22-n is N to one. That is to say, the input side of each of the selectors 22-1 through 22-n is connected to all of ports P#1 through P#N. The output sides of the selectors 22-1 through 22-n are connected to output lines oL#1 through oL#N respectively.

The setting registers 23-1 through 23-n hold selection information used by the selectors 22-1 through 22-n to select a signal, and instruct the selectors 22-1 through 22-n to select a signal. The selection information will be specified by upper software.

As described above, the packet copying section 20 inputs packets input from ports P#1 through P#N to all of the selectors 22-1 through 22-n arranged in N rows, selects a port in each selector on the basis of instructions from the upper software, and outputs the packets.

This structure of the switching apparatus 2 will enable to copy all of the packets input to it. For example, when a packet from port P#1 is output from output lines oL#1 through oL#3, the setting registers 23-1 through 23-3 will hold an identifier for port P#1 specified by the upper software.

The selectors 22-1 through 22-3 select a signal according to this set value. As a result, all of the packets self-routed to port P#1 in the matrix switch 21 will be output from output lines oL#1 through oL#3 by the packet copying section 20.

Now, automatic protection switching (APS) control realized by the switching apparatus 2 will be described. APS means the following function. If data is input from both of a first and second systems, one common control section (the switching apparatus 2, in this case) accepts data only from one of the two systems, processes it, and outputs processed data from both of the two systems.

Figure 2:
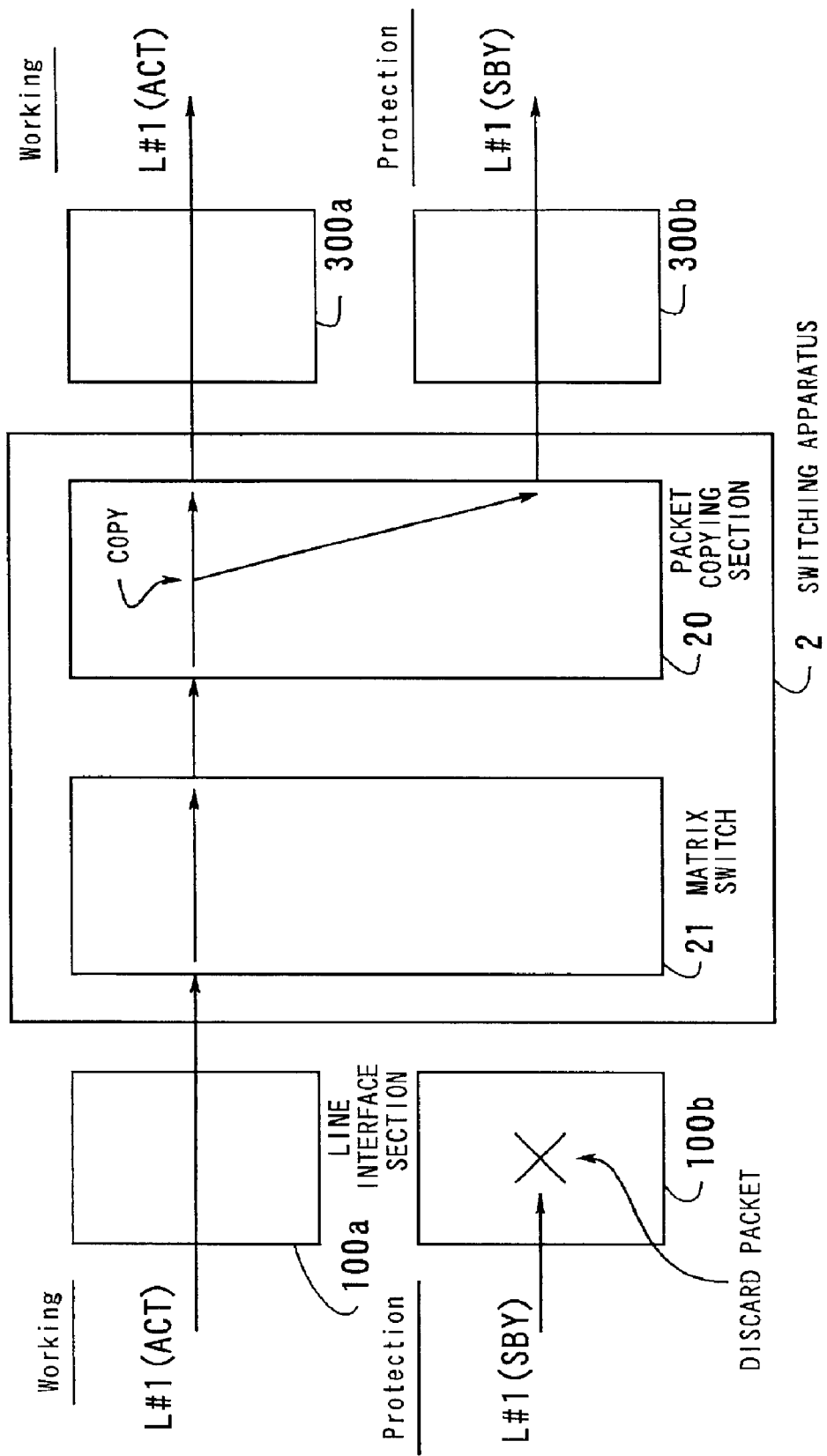
FIG. 2 is a view showing APS in the case of one line being accommodated in Working and Protection.

FIG. 2 is a view showing APS in the case of one line being accommodated in Working and Protection. Line interface sections 100a and 100b are located in Working and Protection, respectively, on the input side of the switching apparatus 2. Line interface sections 300a and 300b are located in Working and Protection, respectively, on the output side of the switching apparatus 2. Lines L#1(ACT) and L#1(SBY) are accommodated in Working and Protection, respectively.

If APS control is performed under this structure, at first a packer from line L#1(SBY) is discarded by the line interface section 100b and a packet only from line L#1(ACT) is input to the switching apparatus 2.

Then self-routing and the copying of the packet are performed in the switching apparatus 2 and the same packets are output from the line interface section 300a in Working and from the line interface section 300b in Protection.

Figure 3:
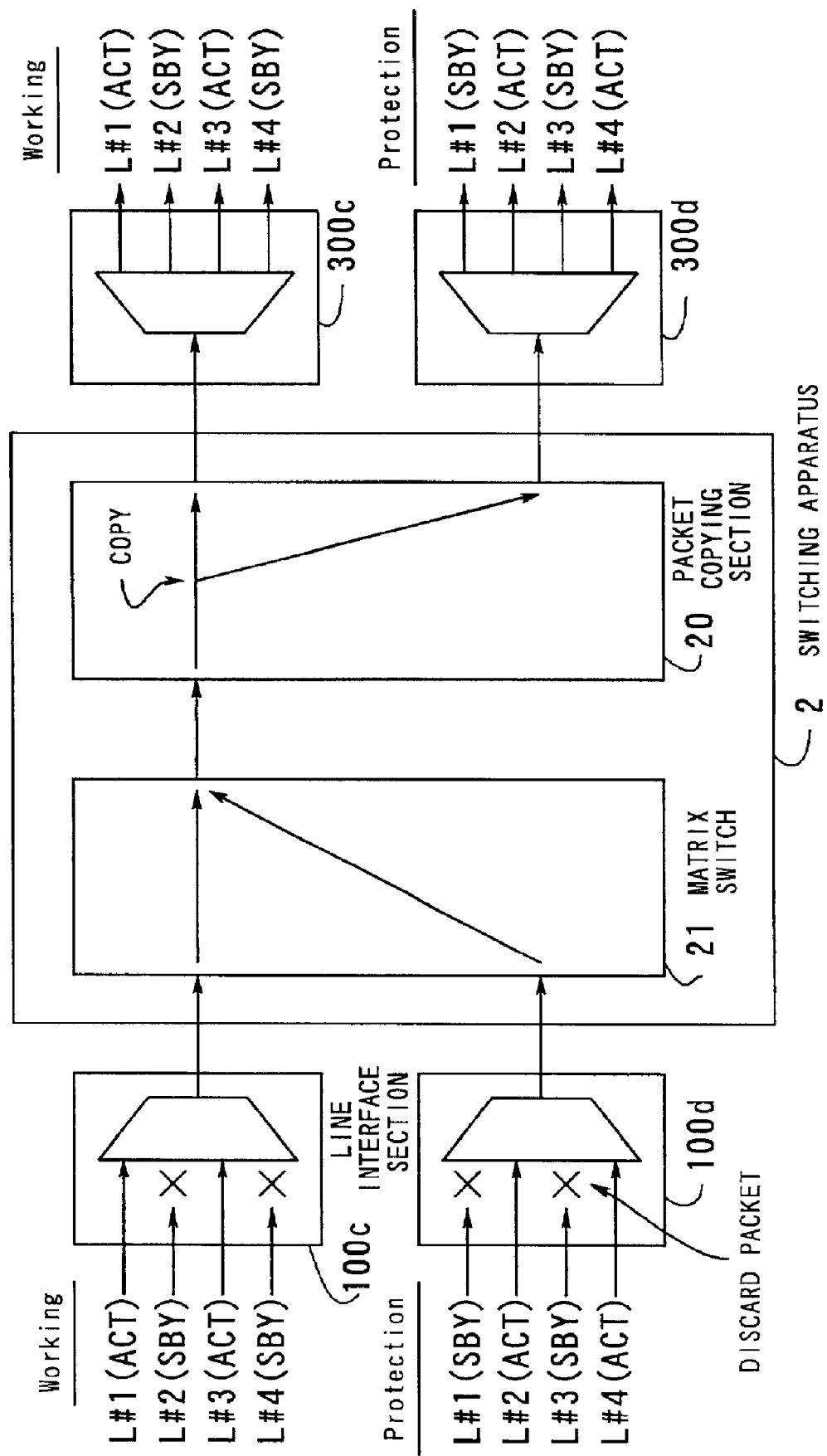
FIG. 3 is a view showing APS in the case of multiple lines being accommodated in Working and Protection.

FIG. 3 is a view showing APS in the case of multiple lines being accommodated in Working and Protection. In FIG. 3, four lines are accommodated. Line interface sections 100c and 100d are located in Working and Protection, respectively, on the input side of the switching apparatus 2. Line interface sections 300c and 300d are located in Working and Protection, respectively, on the output side of the switching apparatus 2.

Lines L#1(ACT), L#2(SBY), L#3(ACT), and L#4(SBY) are accommodated in Working. Lines L#1(SBY), L#2 (ACT), L#3(SBY), and L#4(ACT) are accommodated in Protection.

If APS control is performed under this structure, packers from lines L#2(SBY) and L#4(SBY) in Working are discarded by the line interface section 100c and packets only from lines L#1(ACT) and L#3(ACT) in Working are input.

Furthermore, packers from lines L#1(SBY) and L#3 (SBY) in Protection are discarded by the line interface section 100d and packets only from lines L#2(ACT) and L#4(ACT) in Protection are input.

Then self-routing and the copying of a packet are performed in the switching apparatus 2 and the same packets are output from the line interface section 300c in Working and from the line interface section 300d in Protection.

As described above, regardless of whether one or multiple lines are accommodated in Working and Protection, a packet copied is output to the output side of a system, too, on the input side of which a packet was discarded. This enables to realize APS control.

Apparatus duplex control will now be described. With the above APS, a packet is discarded in the input stage of a line interface section. With apparatus duplex control, however, a packet will be discarded in the input stage of the switching apparatus 2.

Figure 4:
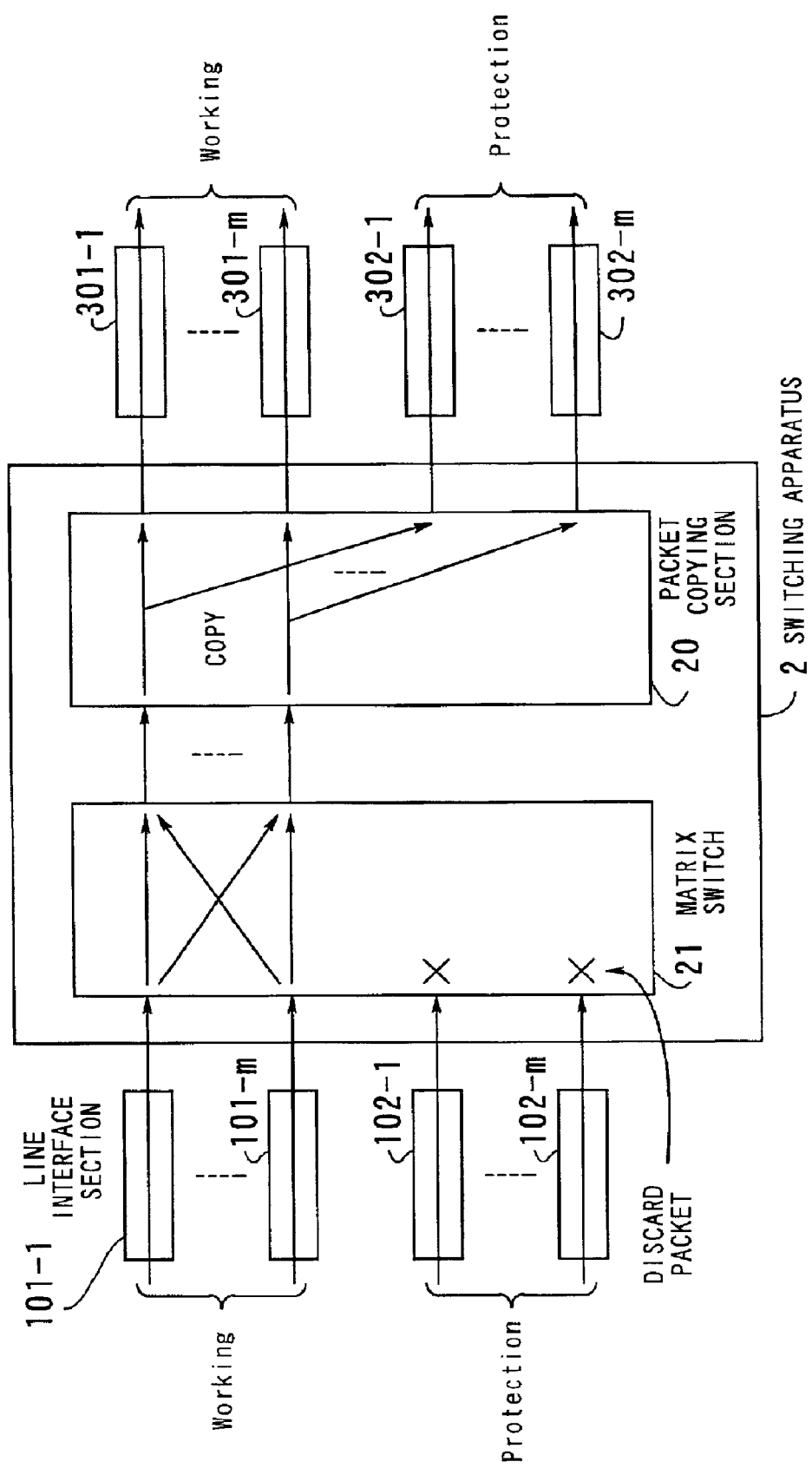
FIG. 4 is a view showing apparatus duplex control.

FIG. 4 is a view showing apparatus duplex control. Line interface sections 101-1 through 101-m and 102-1 through 102-m are located in Working and Protection, respectively, on the input side of the switching apparatus 2. Line interface sections 301-1 through 301-m and 302-1 through 302-m are located in Working and Protection, respectively, on the output side of the switching apparatus 2.

Packets from lines under the control of Protection are discarded in the input stage of the switching apparatus 2. Packets only from lines under the control of Working are input to the switching apparatus 2.

Then self-routing and the copying of a packet are performed in the switching apparatus 2 and packets are output from the line interface sections 301-1 through 301-m in Working and from the line interface sections 302-1 through 302-m in Protection.

Now, control by snooping of outgoing port (SNOP control) realized by the switching apparatus 2 will be described. SNOP is the function of outputting packets not only to an ordinary output route but also to a route to a testing unit after processing by a common control section. This SNOP control will enable to grasp the operative condition of a unit in operation.

Figure 5:
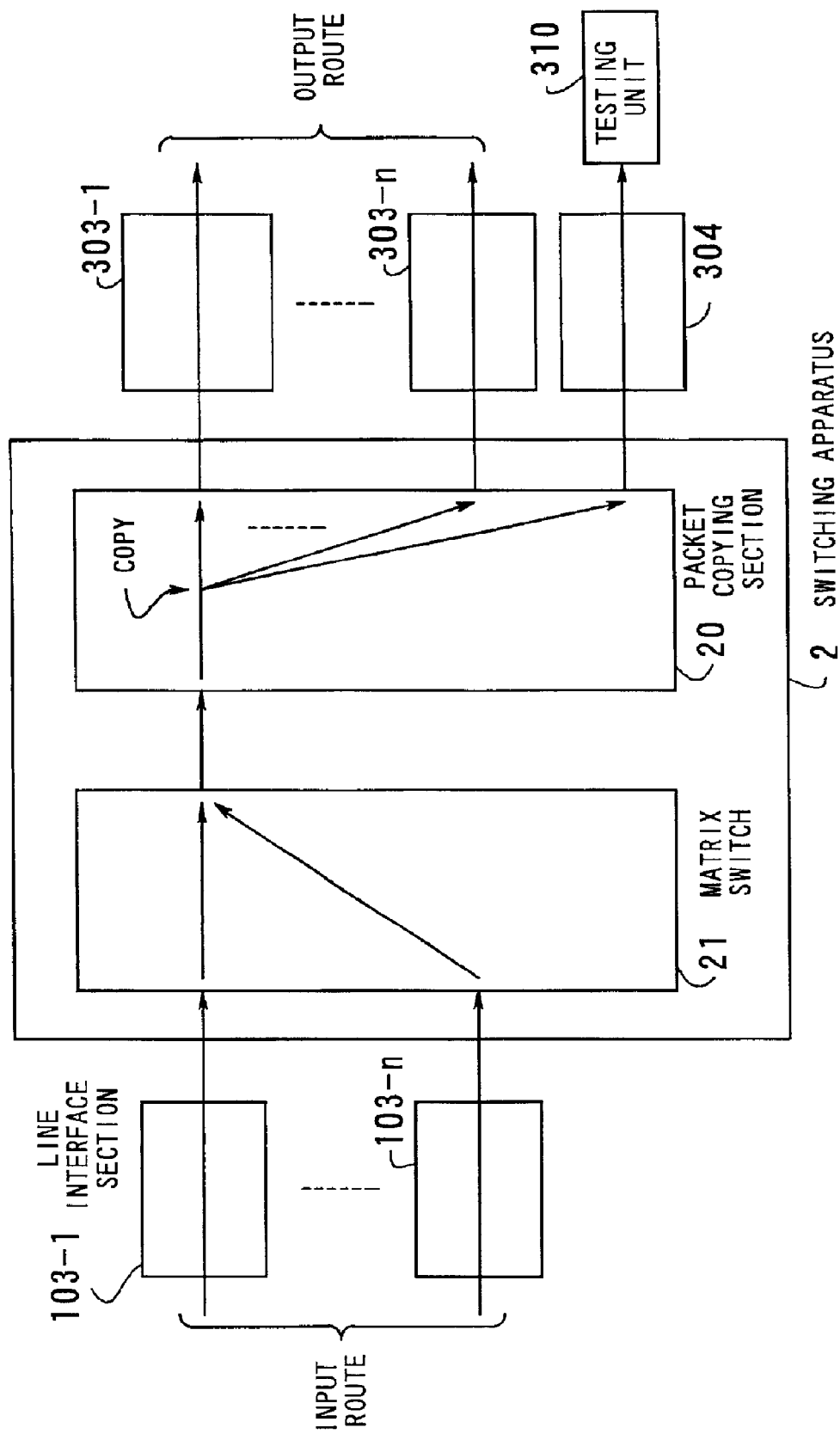
FIG. 5 is a view showing SNOP.

FIG. 5 is a view showing SNOP. Line interface sections 103-1 through 103-n are located on the input route side of the switching apparatus 2 and line interface sections 303-1 through 303-n are located on the output route side of the switching apparatus 2. The output of a line interface section 304 is connected to a testing unit 310.

Under this structure, packets from all of N input routes are input to the switching apparatus 2 and self-routing and the copying of the packets are performed there. Then packets are output from the line interface sections 303-1 through 303-n to N output routes. In addition, a copied packet is sent to the testing unit 310 via the line interface section 304.

As described above, the switching apparatus 2 according to the present invention includes the N×N matrix switch 21 and packet copying section 20 and performs self-routing and the process of copying a packet.

This will save the need to provide a large-scale queue or routing table even in the case of many lines being accommodated, resulting in a smaller amount of hardware and high-speed large-capacity routing. Furthermore, the structure of the switching apparatus 2 according to the present invention will enable to realize APS control, apparatus duplex control, and SNOP control easily.

Figure 6:
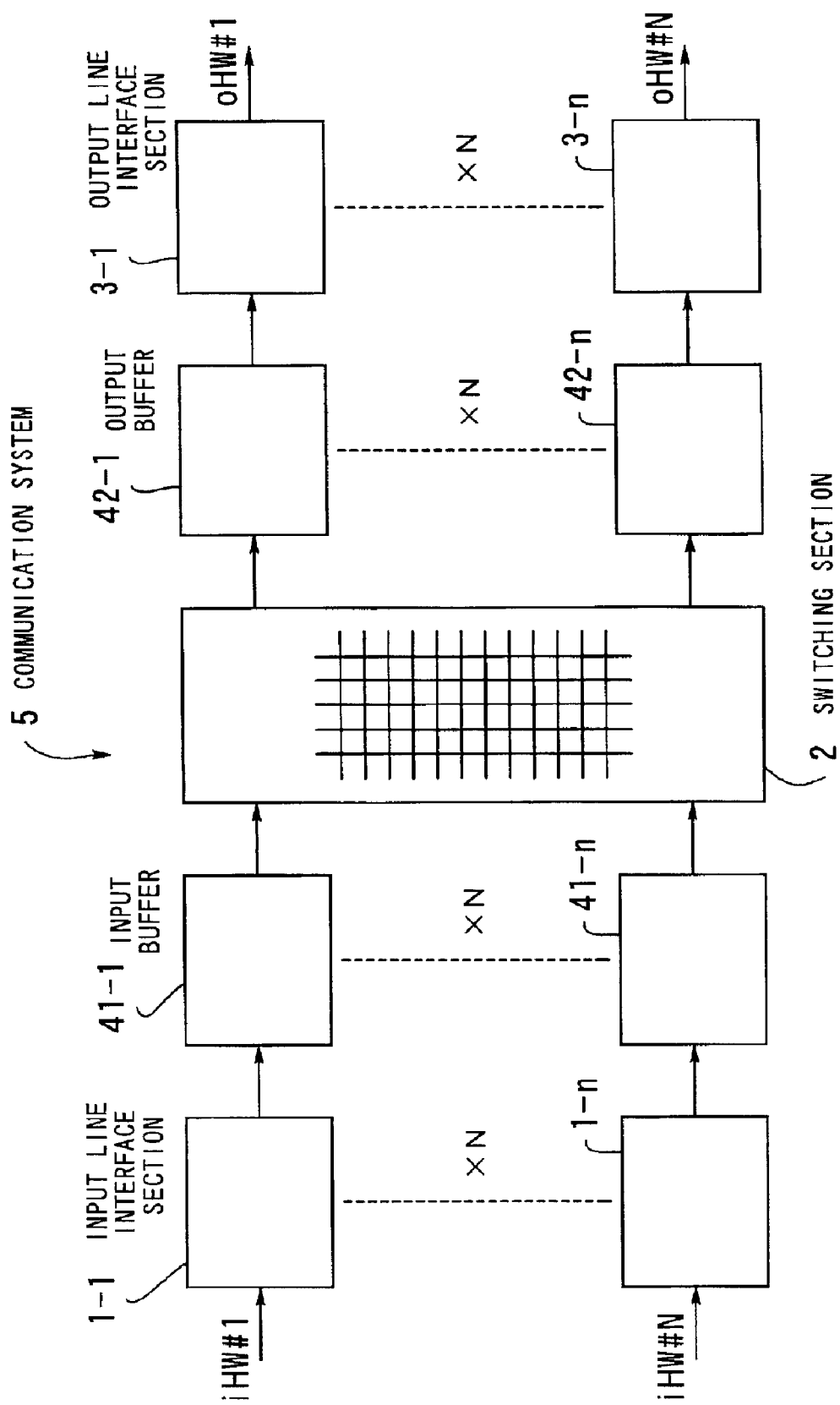
FIG. 6 is a view showing the structure of a communication system.

A communication system according to the present invention will now be described. FIG. 6 is a view showing the structure of a communication system. A communication system 5 comprises input line interface sections 1-1 through 1-n (collectively referred to as an input line interface section 1), input buffers 41-1 through 41-n (an input buffer 41), output line interface sections 3-1 through 3-n (an output line interface section 3), output buffers 42-1 through 42-n (an output buffer 42), and a switching section 2 (which corresponds to the above switching apparatus 2).

The input line interface sections 1-1 through 1-n are connected to input routes iHW#1 through iHW#N respectively. The output line interface sections 3-1 through 3-n are connected to output routes oHW#1 through oHW#N respectively.

Figure 7:
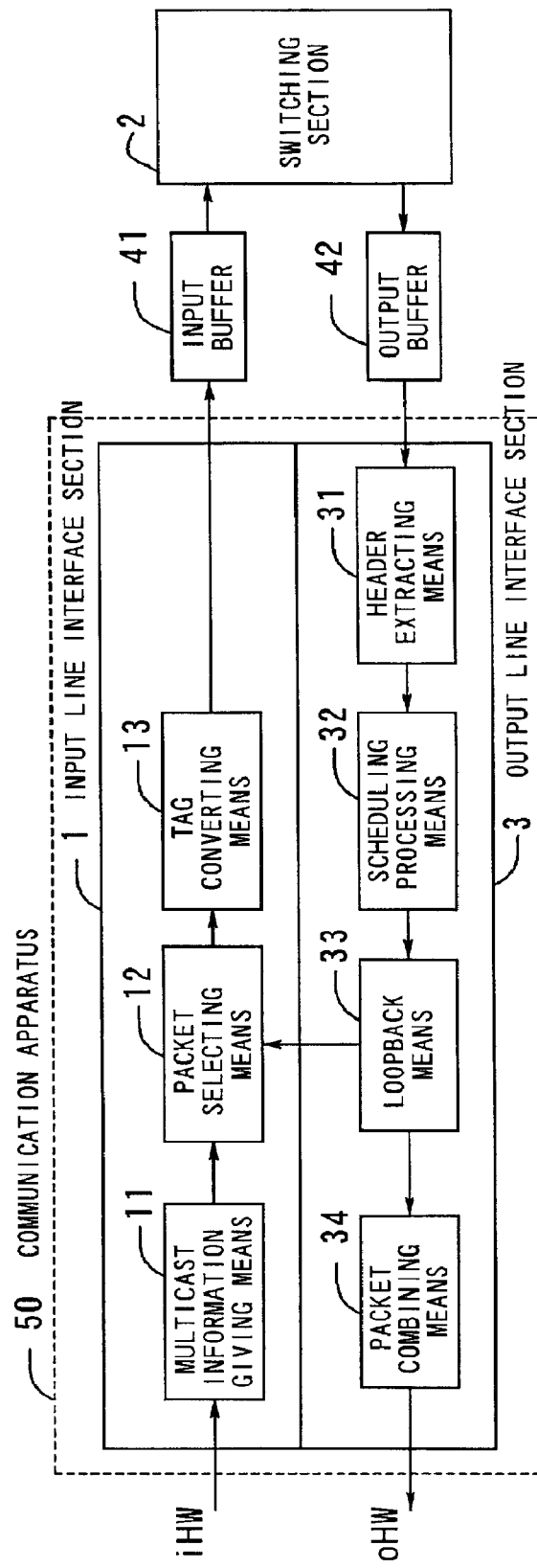
FIG. 7 is a view showing the structure of input/output line interface sections.

FIG. 7 is a view showing the structure of an input and output line interface section. An input line interface section and output line interface section each corresponding to an input route and output route with the same number are mounted on one LSI (which corresponds to a communication apparatus according to the present invention).

In FIG. 6, the input line interface section 1-1 and output line interface section 3-1, for example, are included in one LSI. This is the same with the other line interface sections.

Multicast information giving means 11 in an input line interface section 1 in a communication apparatus 50 divides a variable-length frame input into a plurality of fixed-length packets, and gives multicast identification information to the effect that a multicast is performed only to the leading packet as multicast information (1-bit information to indicate whether a multicast is performed) in the case of multicasting the frame.

Packet selecting means 12 selects one of a packet output from the multicast information giving means 11 and a packet which loops back from an output line interface section 3 and sends it to tag converting means 13.

The tag converting means 13 recognizes multicast identification information for a packet to be multicasted (hereinafter referred to as a multicast packet) output from the packet selecting means 12 and makes a search for its output route by the use of a look-up table described later. Then the tag converting means 13 converts a tag for the packet into one including output route information it found (that is to say, an old tag is removed and a new tag which shows an output route to the next output destination is added).

Header extracting means 31 in the output line interface section 3 in the communication apparatus 50 receives a packet routed and copied by the switching section 2 and extracts a header from it.

Scheduling processing means 32 has a packet buffer for storing a packet. The scheduling processing means 32 performs scheduling to guarantee the continuity of a frame (the continuity of packets at the time of a frame being generated) and writes and reads a packet. This scheduling process can avoid packet interleaving.

Loopback means 33 causes a packet read from the packet buffer to loop back to the input line interface section 1.

Packet combining means 34 combines packets into a frame and outputs the packets from an appropriate output route.

Figure 8:
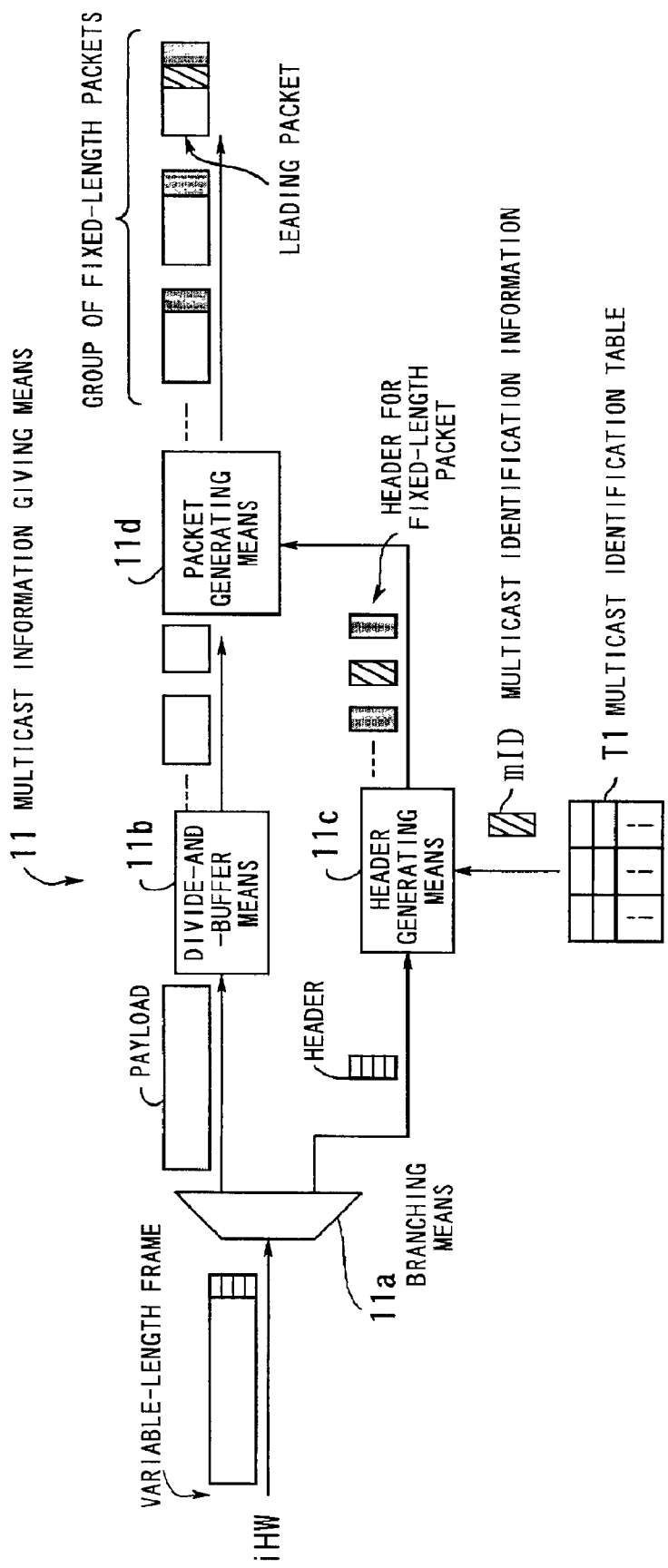
FIG. 8 is a view showing the structure of multicast information giving means.

The multicast information giving means 11 will now be described. FIG. 8 is a view showing the structure of the multicast information giving means 11. The multicast information giving means 11 includes branching means 11a, divide-and-buffer means 11b, header generating means 11c, and packet generating means 11d.

The branching means 11a receives a variable-length frame (a frame to be multicasted) sent from an input route iHW and branches it into a payload portion and header portion. The payload and header portions are sent to the divide-and-buffer means 11b and header generating means 11c respectively. Hereinafter a frame to be multicasted is referred to as a multicast frame.

The divide-and-buffer means 11b stores, divides, and outputs a payload. Writing a payload to the divide-and-buffer means 11b will be completed after it is validated by a parity check and frame length check. When it is completed, a write-to-buffer completion flag will be set.

When the write-to-buffer completion flag is set, the header generating means 11c obtains 1-bit multicast identification information mID from a multicast identification table T1 with a packet identifier (PID) for identifying a packet in a header as a search key. The header generating means 11c also generates a header for a fixed-length packet on the basis of various pieces of information in the header while it is performing the above process.

The packet generating means 1id receives the payload divided by the divide-and-buffer means 11b and the header for a fixed-length packet and the multicast identification information mID sent from the header generating means 11c and generates a fixed-length packet.

The multicast identification information mID is given only to a leading packet (stored in the payload area of a leading packet). An identifier showing the leading packet of a frame is stored in its header.

Figure 9:
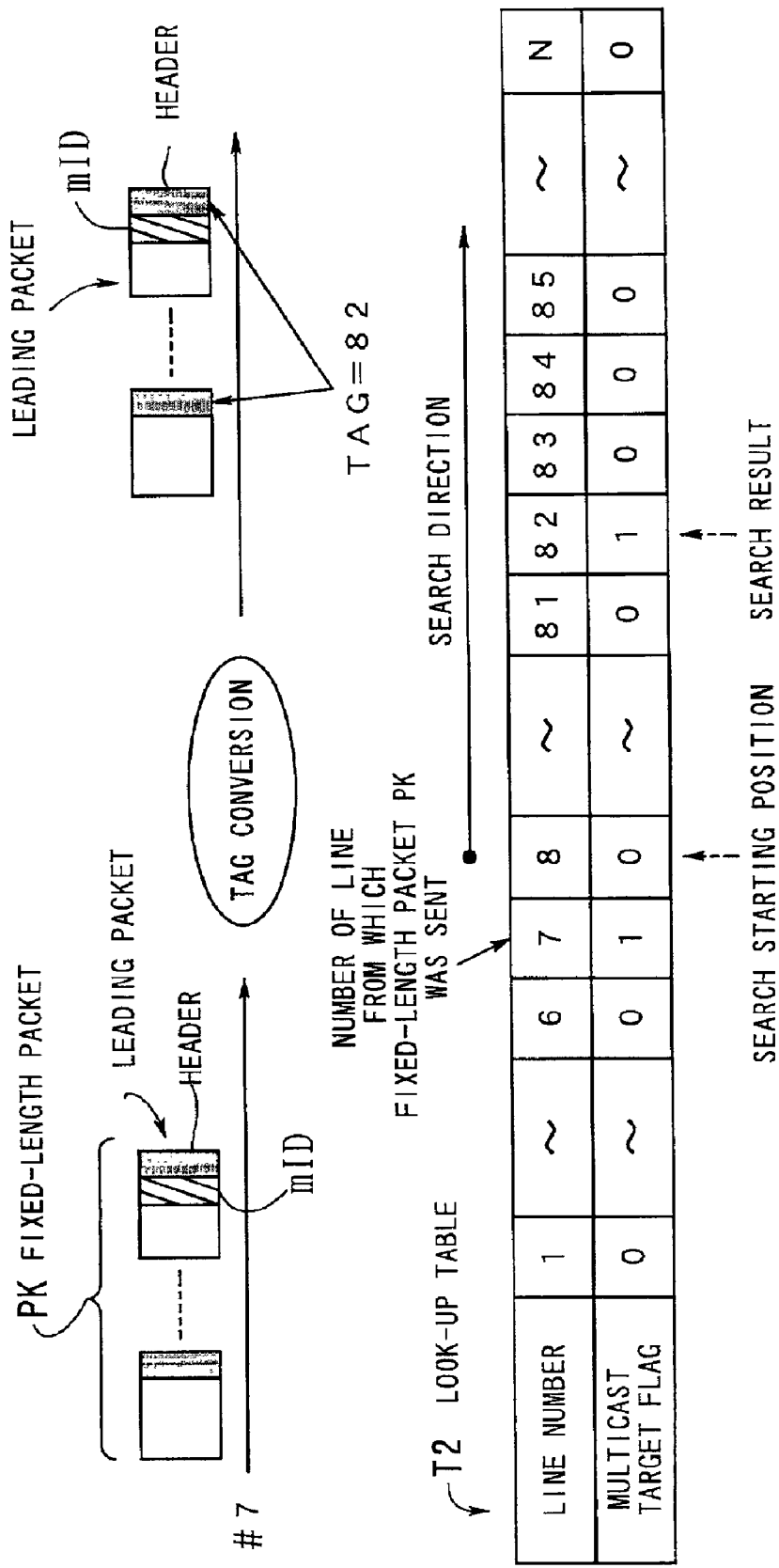
FIG. 9 is a view showing how to convert a tag.

The tag converting means 13 will now be described. FIG. 9 is a view showing how to convert a tag. The tag converting means 13 receives a group of fixed-length packets (fixed-length packet PK) generated by dividing a frame to be multicasted. This group of fixed-length packets compose one frame. Furthermore, the tag converting means 13 obtains multicast identification information mID from the leading packet.

When the tag converting means 13 recognizes on the basis of the multicast identification information mID that it is a multicast packet (multicast frame), it makes a search for an output route to which the fixed-length packet PK should be output by the use of a look-up table T2 located in the tag converting means 13.

In this case, upper software informs the tag converting means 13 about the number of a line from which the fixed-length packet PK it received was sent. The tag converting means 13 therefore starts a search at first from a line with a number being one higher than the above number. For example, if the fixed-length packet PK was sent from line #7, then the tag converting means 13 will start a search from line #8 in the look-up table T2.

The output route is a line where a multicast target flag is set to "1." In this example, the multicast target flag is set to "1" at line #82, so the fixed-length packet PK will be output from the output route of line #82.

The tag converting means 13 gives a new tag, being output route information obtained by the above search, to the fixed-length packet PK. In this example, it gives a tag including the output route information of TAG=82 to the fixed-length packet PK.

The search procedure by the tag converting means 13 is as follows. The tag converting means 13 searches in turn from a line with a number being one higher than that of a line from which the fixed-length packet PK was sent and finally returns to the line from which the fixed-length packet PK was sent. For example, if the number of a line from which the fixed-length packet PK was sent is seven, the tag converting means 13 searches in order from line #8 to line #N, then returns to line #1, and finally searches line #7.

A search process with the look-up table T2 should be performed only when the tag converting means 13 recognizes a leading packet including the multicast identification information mID. Tags for the following divided packets should be converted in order to ones including a result obtained by the search.

As described above, the multicast information giving means 11 gives multicast identification information mID and the tag converting means 13 makes a search for an output route by the use of the look-up table T2. By doing so, a packet will be transferred to multicast routes.

Now, another embodiment for transferring a packet to multicast routes will be described. In this embodiment, the multicast information giving means 11 gives not only multicast identification information mID but also multicast route information showing routes to which a packet should be multicasted, as multicast information. This multicast route information is the same as the contents of the look-up table T2 and is bit map information showing an output route to which a packet should be multicasted by the value of a bit.

The input line interface section 1, from which multicast is performed, gives this multicast route information to a leading packet in the first stage. The tag converting means 13 in way blocks converts tags on the basis of the multicast route information. This structure can also control the transfer of a packet to multicast routes.

When such control is performed, an error of multicast route information may occur during transfer. Therefore, when multicast route information is given, codes for error correction, such as a cyclic redundancy check (CRC), are also given. This enables the tag converting means 13 to check whether multicast route information is right.

Figure 10:
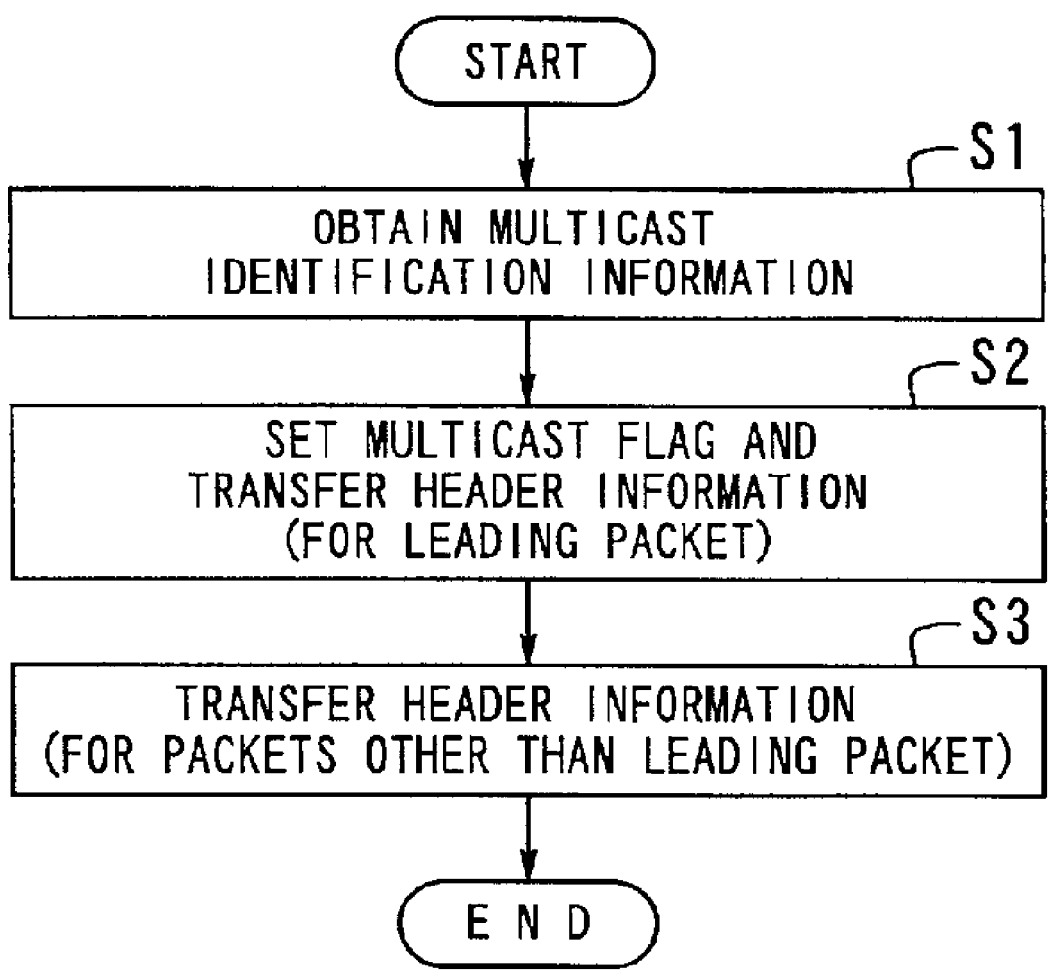
FIG. 10 is a flow chart showing the procedure of the operation of header extracting means.

The header extracting means 31 will now be described. FIG. 10 is a flow chart showing the procedure of the operation of the header extracting means 31.

[S1] The header extracting means 31 obtains multicast identification information mID stored in a payload area from the leading packet of a multicast frame it received.

[S2] If the bit value of the multicast identification information mID it obtained is one, the header extracting means 31 sets a multicast flag and transfers header information including the multicast identification information to write control means described later.

[S3] With packets in the same frame other than the leading packet, the header extracting means 31 transfers the header information to the write control means according to the multicast flag.

Figure 11:
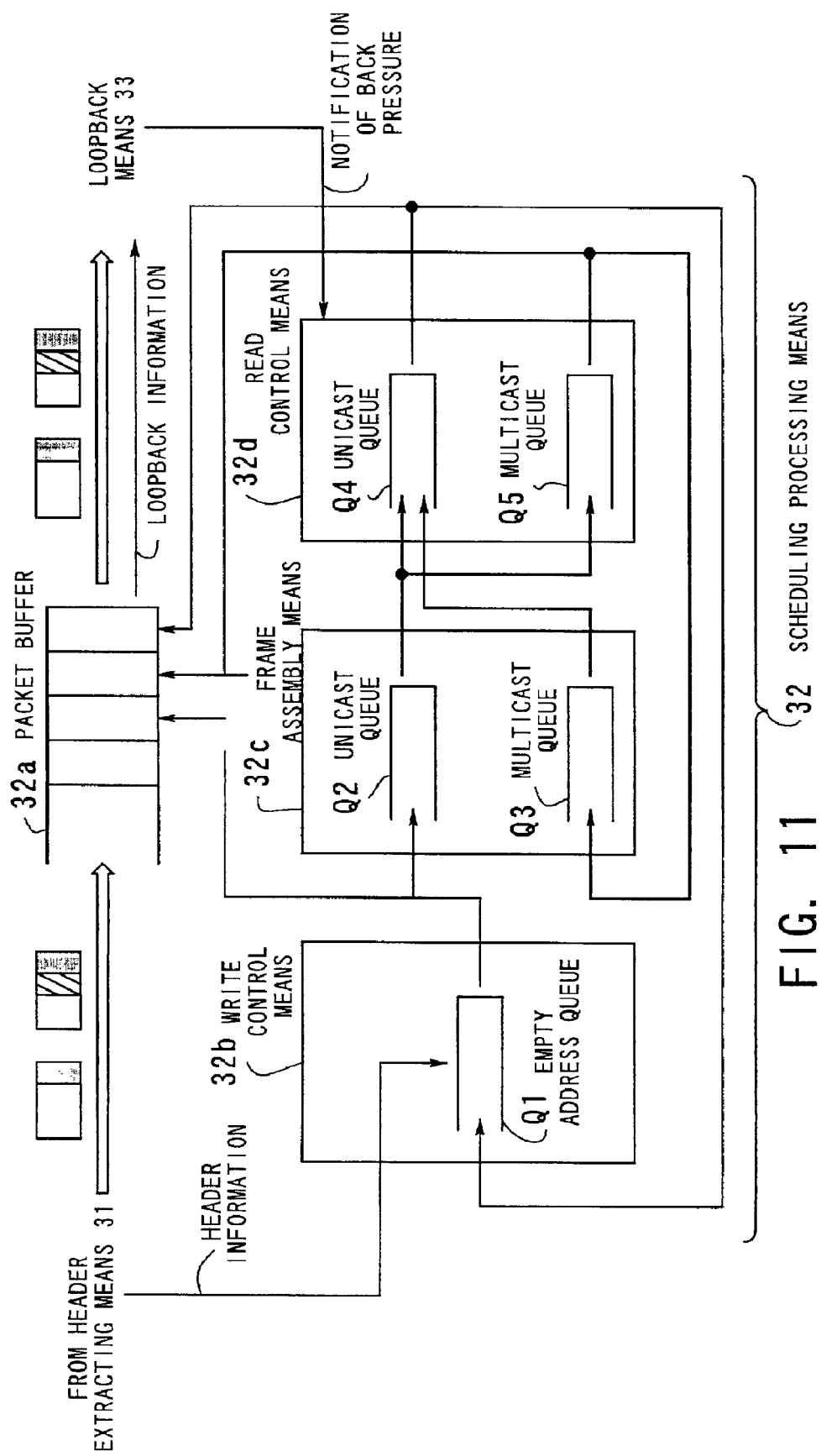
FIG. 11 is a view showing the structure of scheduling processing means.

The scheduling processing means 32 will now be described. FIG. 11 is a view showing the structure of the scheduling processing means 32. The scheduling processing means 32 comprises a packet buffer 32a, the write control means 32b, frame assembly means 32c, and read control means 32d.

The write control means 32b includes an empty address queue Q1, the frame assembly means 32c includes a unicast queue Q2 and multicast queue Q3, and the read control means 32d includes a unicast queue Q4 and multicast queue Q5. In this case, the unicast queues are used on the line output side and the multicast queues are used on the loopback side.

The write control means 32b judges on the basis of the header information sent from the header extracting means 31 whether or not a packet can be written to the packet buffer 32a. If a packet can be written to the packet buffer 32a, the write control means 32b obtains a write address (WA) from the empty address queue Q1 and sends the WA to the packet buffer 32a and frame assembly means 32c.

The packet buffer 32a stores a packet sent from the header extracting means 31 according to the WA it received.

The frame assembly means 32c causes a chain of WAs to be formed in the unicast queue Q2 on the basis of the WA the write control means 32b obtained from the empty address queue Q1. When the queuing of WAs corresponding to one frame is completed, the frame assembly means 32c sends assembly information to the read control means 32d. That is to say, when WAs of packets corresponding to one frame are queued, the frame assembly means 32c considers the assembly of one frame to have been completed and sends these WAs as assembly information.

When the read control means 32d receives the assembly information, it causes chains of WAs according to scheduling groups (SGRP) to be formed in the multicast queue Q5 on the basis of the WAs, being assembly information, in the case of performing a loopback.

If a read address (RA) is not issued from the unicast queue Q4 and there is no notification of back pressure (signal output when a loopback FIFO described later is full) from the loopback means 33 described later, then the multicast queue Q5 sends an RA to the packet buffer 32a.

In other words, the reading of packets corresponding to one frame written to the packet buffer 32a is controlled by using a chain of WAs formed in the multicast queue Q5 as an RA. Furthermore, the multicast queue Q5 sends this RA to the frame assembly means 32c as read information showing that reading from the packet buffer 32a was controlled.

The packet buffer 32a reads a packet according to the RA from the multicast queue Q5 and sends the packet and loopback information (signal showing whether or not the packet is one which looped back) to the loopback means 33. In this case, the packet is a loopback one.

When the frame assembly means 32c receives the read information, again it causes chains of WAs according to SGRPs to be formed in the multicast queue Q3 with the RA, being read information, as a WA. When the queuing of WAs corresponding to one frame is completed, the frame assembly means 32c sends these WAs to the read control means 32d as assembly information.

When the read control means 32d receives the assembly information, it causes a chain of WAs to be formed in the unicast queue Q4 on the basis of the WAs, being assembly information, in the case of performing a unicast. After a chain of WAs is formed, the unicast queue Q4 sends the chain of WAs to the packet buffer 32a as an RA. The unicast queue Q4 also sends this RA to the write control means 32b as read information.

The packet buffer 32a reads a packet according to the RA it received from the read control means 32d and sends the packet and loopback information to the loopback means 33.

When the write control means 32b receives the read information, it considers scheduling control of output on the line and loopback sides of packets corresponding to one frame to have been completed and releases a WA corresponding to the RA. Furthermore, the write control means 32b updates a chain of WAs in the empty address queue Q1.

If the read control means 32d receives notification of back pressure from the loopback means 33, it stops reading a packet from the packet buffer 32a. This will ease congestion in the loopback FIFO described later.

The scheduling processing means 32 can realize QOS (quality of service)-guaranteed control by performing the above scheduling process in order of precedence in QOS class.

Figure 12:
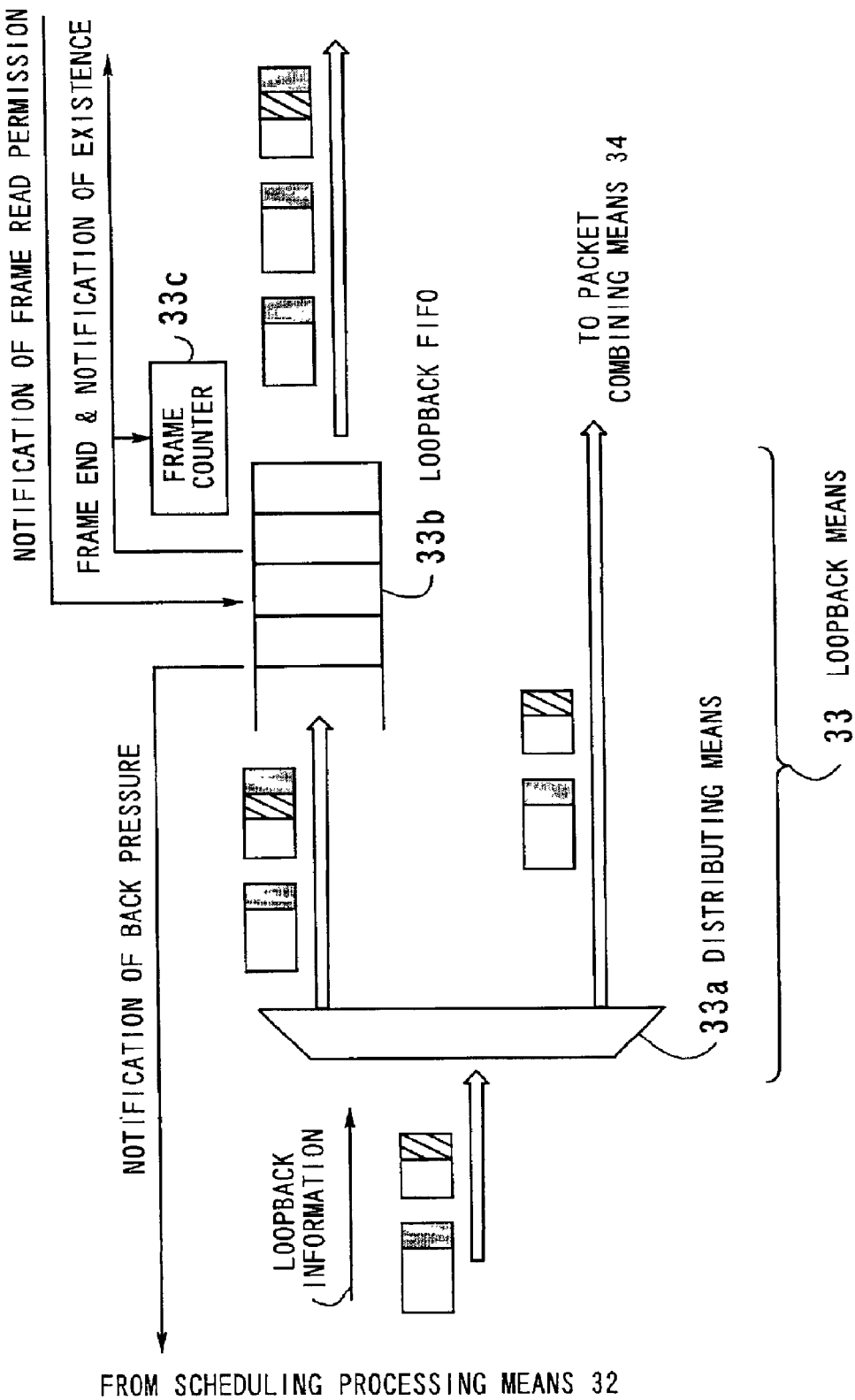
FIG. 12 is a view showing the structure of loopback means.

The loopback means 33 will now be described. FIG. 12 is a view showing the structure of the loopback means 33. The loopback means 33 comprises distributing means 33a, the loopback FIFO 33b, and a frame counter 33c.

The distributing means 33a sends a packet to the loopback FIFO 33b or the packet combining means 34 described later on the basis of loopback information from the scheduling processing means 32.

The loopback information of "1" indicates that a packet the distributing means 33a received is one which looped back. The distributing means 33a sends it to the loopback FIFO 33b. The loopback information of "0" indicates that a packet the distributing means 33a received is not one which looped back. The distributing means 33a sends it to the packet combining means 34.

The loopback FIFO 33b receives a packet. If it is the leading packet or an intermediate packet of a frame, the loopback FIFO 33b checks by comparing a write pointer (WP) and read pointer (RP) whether an FIFO is full, before the loopback FIFO 33b writes it to the FIFO. If the FIFO is full, the loopback FIFO 33b sets an FIFO-full flag and sends notification of back pressure to the scheduling processing means 32. If the FIFO is not full, the loopback FIFO 33b writes it to the FIFO.

When the loopback FIFO 33b writes the end packet of a frame to the FIFO, it performs the above operation being necessary in the case of the FIFO being full. In addition, the loopback FIFO 33b sets a frame end flag and existence flag, sends them to the packet selecting means 12 described later, and increments the frame counter 33c.

Packets corresponding to one frame are read continuously from the loopback FIFO 33b when notification of frame read permission from the packet selecting means 12 described later is received.

When the loopback FIFO 33b reads the leading packet or an intermediate packet of a frame, it resets the frame end flag and checks by comparing an RP and WP whether the FIFO is full. If the FIFO is not full, the loopback FIFO 33b resets the FIFO-full flag.

When the loopback FIFO 33b reads the end packet of a frame, it updates an RP and checks whether the FIFO is full. This is the same with the leading packet and an intermediate packet. Furthermore, the loopback FIFO 33b sets a frame end flag and sends notification of frame end to the packet selecting means 12. In addition, the loopback FIFO 33b decrements the frame counter 33c. When the count reaches zero, the loopback FIFO 33b resets the existence flag (flag showing the existence of a loopback packet) and cancels the notification of existence sent to the packet selecting means 12.

Figure 13:
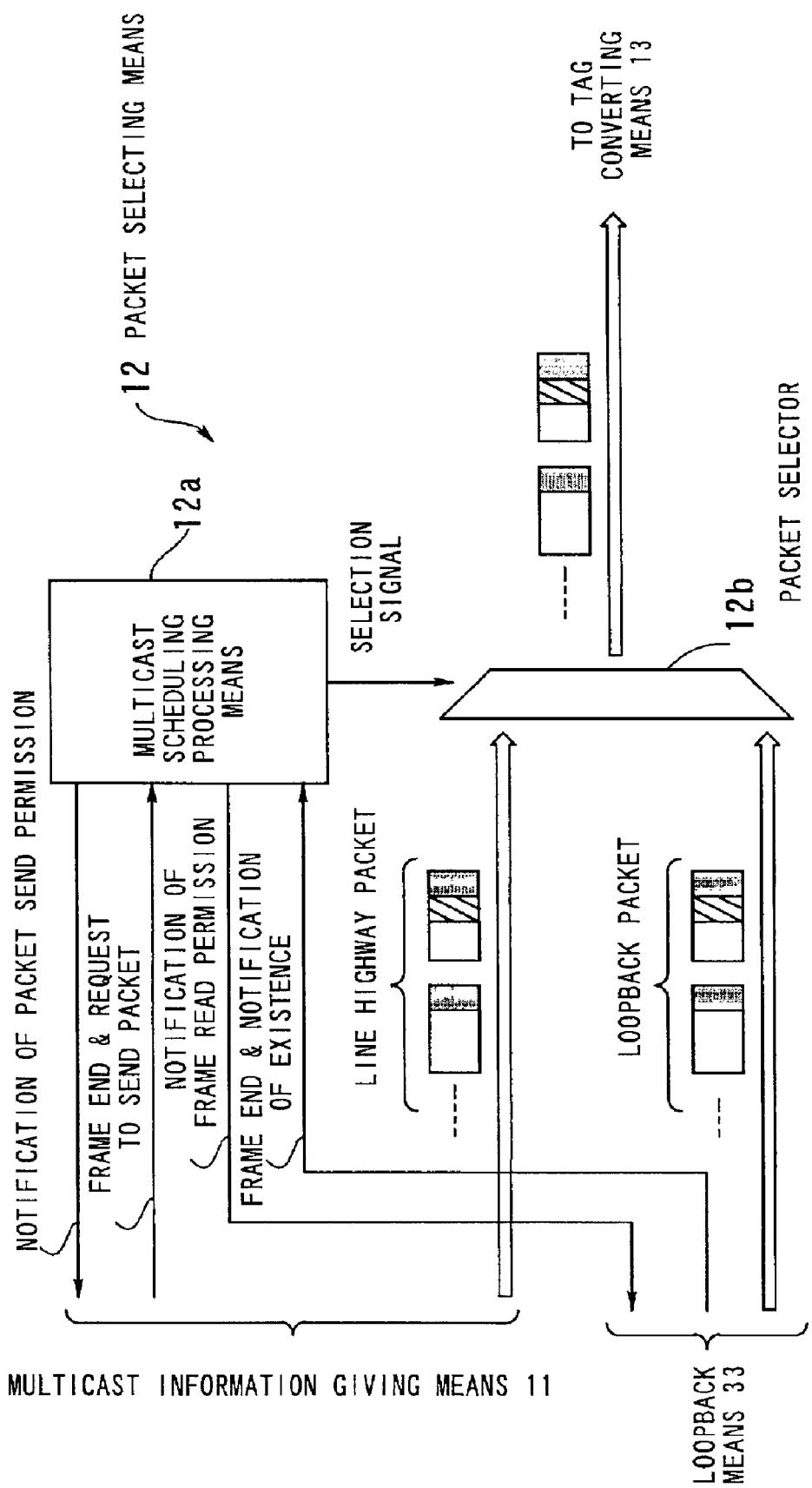
FIG. 13 is a view showing the structure of packet selecting means.

The packet selecting means 12 will now be described. FIG. 13 is a view showing the structure of the packet selecting means 12. The packet selecting means 12 comprises multicast scheduling processing means 12a and a packet selector 12b.

The multicast scheduling processing means 12a receives a request to send a packet sent from the multicast information giving means 11 when data corresponding to one frame has been stored in the divide-and-buffer means 11b (described before with reference to FIG. 8). Furthermore, the multicast scheduling processing means 12a receives notification of existence sent from the loopback means 33 when data corresponding to one frame has been stored in the loopback FIFO 33b (described before with reference to FIG. 12).

Then the multicast scheduling processing means 12a performs reconciliation control of a packet (line highway packet) sent from the multicast information giving means 11 and a packet sent from the loopback means 33 (loopback packet) and generates a selection signal to indicate which packet to select. Furthermore, the multicast scheduling processing means 12a sends notification of packet send permission and notification of frame read permission to the multicast information giving means 11 and loopback means 33 respectively.

Usually priority is given to a line highway packet in the case of reconciliation control. After packets corresponding to one frame are read, reconciliation control will be performed again.

If the multicast scheduling processing means 12a does not receive a request to send a packet from the multicast information giving means 11 but receives notification of frame end from the multicast information giving means 11 and a request to read from the loopback means 33, the multicast scheduling processing means 12a sends notification of frame read permission to the loopback means 33, and the packet selector 12b continues to select loopback packets corresponding to one frame until the multicast scheduling processing means 12a receives notification of frame end.

If a request to read from the loopback means 33 continues and the reading of loopback packets corresponding to one frame is completed, a line highway packet is selected in response to a request to send a packet from the multicast information giving means 11.

The packet combining means 34 will now be described. If the leading packet of a multicast frame is received, data except multicast identification information mID is written from the payload area to a buffer.

If an intermediate packet or the end packet of a multicast frame is received, all the data in the payload area is written to a buffer. If data in the end packet is written, an end flag is set and a frame counter is incremented.

If the frame counter shows a value greater than or equal to one, data is read continuously from the leading address through an address where an end flag is set. After data is read from an address where an end flag is set, the end flag is reset and the frame counter is decremented. This enables to make packets into frames and output them.

Figure 14:
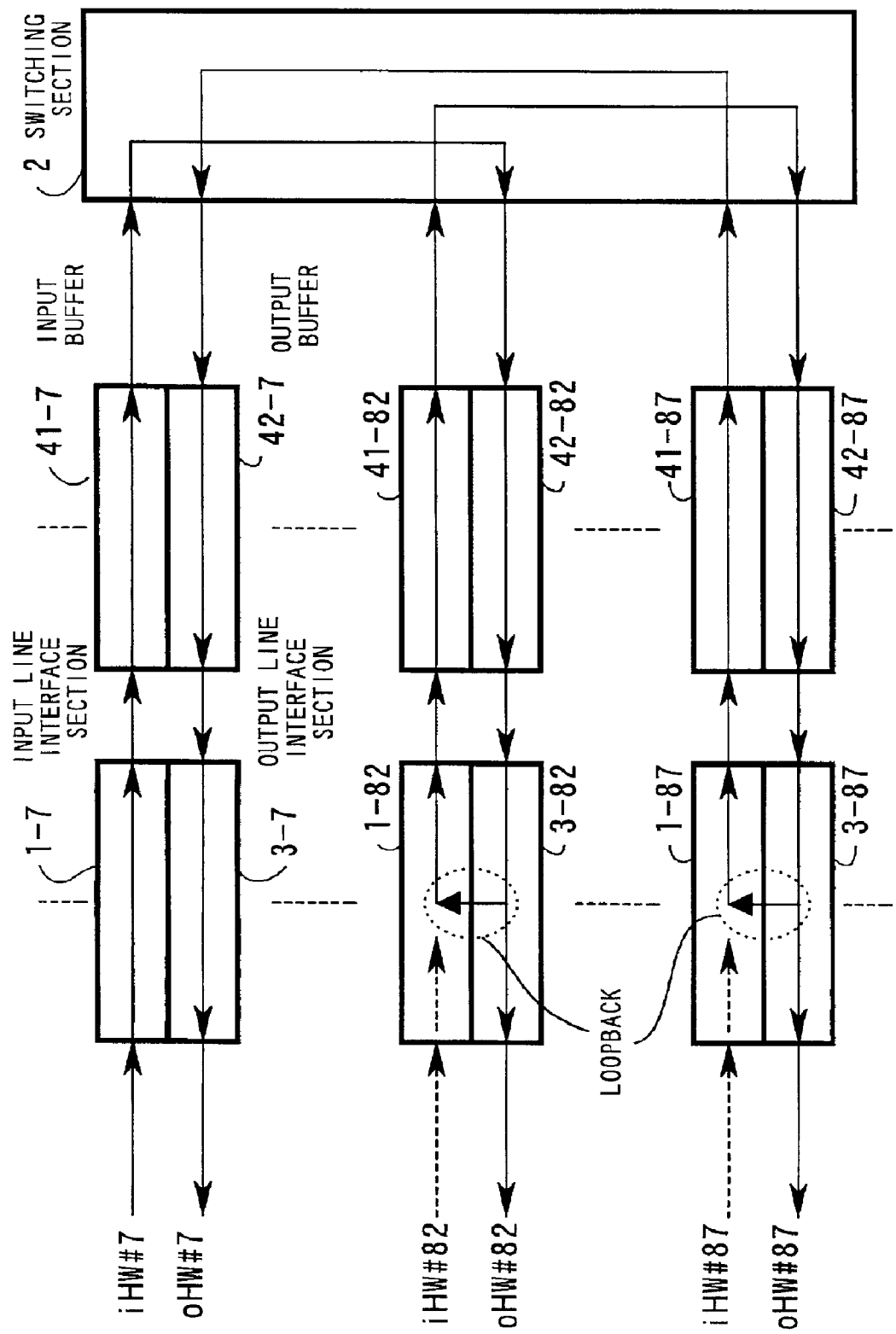
FIG. 14 is a view showing an example of a recursive multicast.

Now, the flow of packets at the time of a recursive multicast will be described by example. FIG. 14 is a view showing an example of a recursive multicast.

An input line interface section 1-7 divides a frame input from input route iHW#7 into packets, gives multicast identification information mID, and converts tag information (TAG=82).

A packet with TAG=82 is sent to the switching section 2 via an input buffer 41-7 and a process for routing to HW#82 is performed by the switching section 2 (this is the same with a unicast).

The packet with TAG=82 is sent to an output line interface section 3-82 via an output buffer 42-82.

The output line interface section 3-82 outputs the packet with TAG=82 to output route oHW#82 and causes it to loop back to an input line interface section 1-82.

The input line interface section 1-82 effects conciliation between a packet from input route iHW#82 and a packet which loops back and selects the packet which loops back. Then the input line interface section 1-82 converts tag information (TAG=87).

A packet with TAG=87 is sent to the switching section 2 via an input buffer 41-82 and a process for routing to HW#87 is performed by the switching section 2 (this is the same with a unicast).

The packet with TAG=87 is sent to an output line interface section 3-87 via an output buffer 42-87.

The output line interface section 3-87 outputs the packet with TAG=87 to output route oHW#87 and causes it to loop back to an input line interface section 1-87.

The input line interface section 1-87 effects conciliation between a packet from input route iHW#87 and a packet which loops back and selects the packet which loops back. Then the input line interface section 1-87 converts tag information (TAG=7).

A packet with TAG=7 is sent to the switching section 2 via an input buffer 41-87 and a process for routing to HW#7 is performed by the switching section 2 (this is the same with a unicast).

The packet with TAG=7 is sent to an output line interface section 3-7 via an output buffer 42-7.

The output line interface section 3-7 outputs the packet with TAG=7 to output route oHW#7.

As described above, on the input line sides of the communication apparatus 50 and communication system 5 according to the present invention, a frame is divided into packets, multicast identification information is given, and tags for the packets are converted. On the output line sides, the loopback of packets and scheduling in the case of the loopback are performed and the packets are combined and output from an appropriate output route.

This will enable an efficient recursive multicast and complicated address management will become unnecessary. Furthermore, the scale of circuits in hardware is reduced, resulting in a shorter process for developing LSIs.

Packet transfer stopping means will now be described. If a line failure etc. are detected, the packet transfer stopping means makes the corresponding bit information in multicast route information invalid. Then the packet transfer stopping means stops the transfer of packets to a line where the failure occurred. This enables to continue the transfer of packets only to normal lines.

Figure 15:
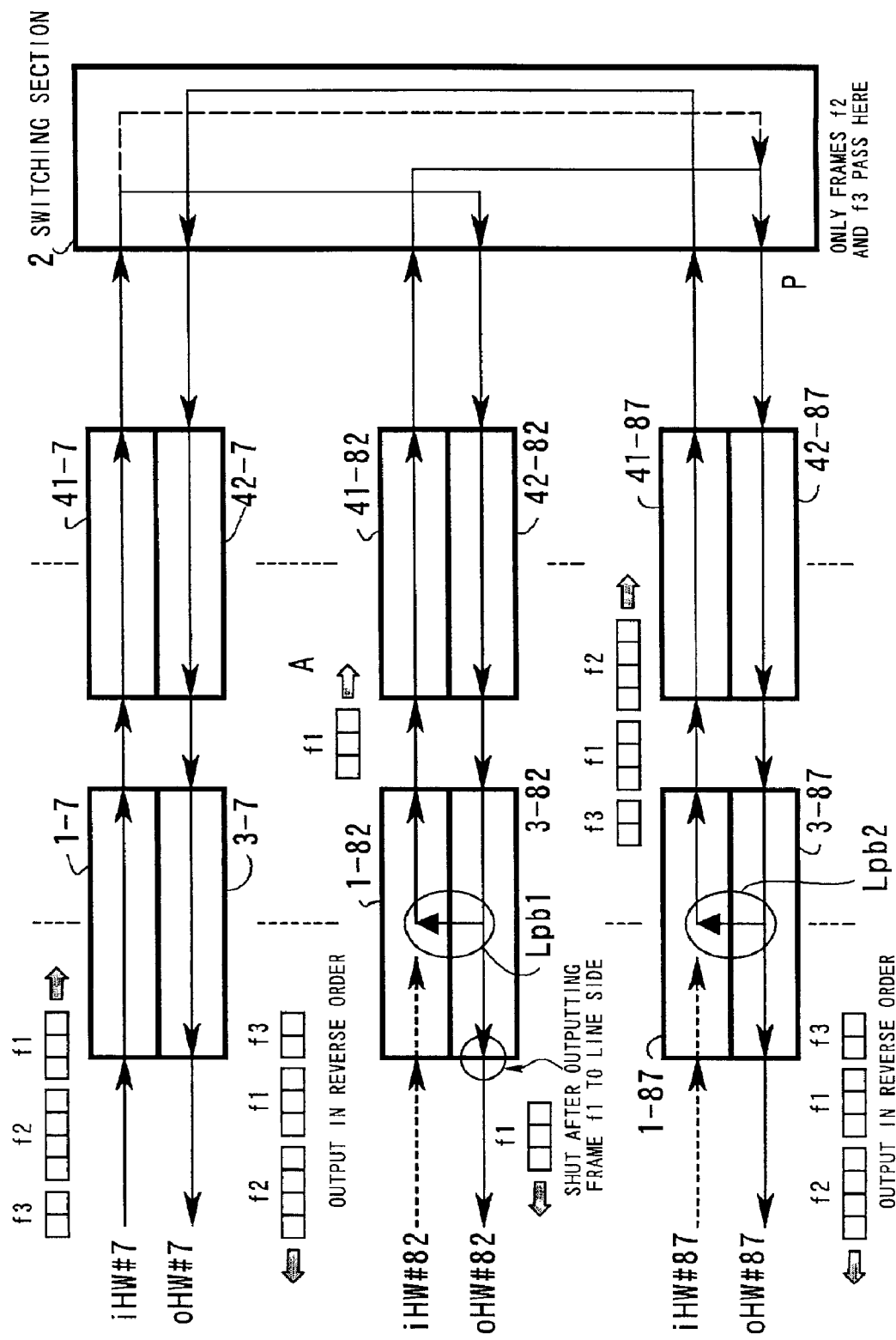
FIG. 15 is a view showing reversion of the order of frames.

Now, reversion of the order of frames at the time of a recursive multicast will be described. FIG. 15 is a view showing reversion of the order of frames. It is assumed that frames f1, f2, and f3 are input from input route iHW#7 in that order and that frames f1, f2, and f3 are multicasted to output oHW#82, then to output route oHW#87, and then to output route oHW#7.

In this multicast tree, it is assumed that after frame f1 loops back at position Lpb1, HW#82 falls off from the multicast because of, for example, a line failure (frame output from oHW#82 is stopped). Then frame f1 will be transferred to iHW#7, oHW#82, oHW#87, and oHW#7 in this order. However, the following frames f2 and f3 will be transferred to iHW#7, oHW#87, and oHW#7 in this order under the control of the packet transfer stopping means.

In this case, frame f2 flows to oHW#87 while frame f1 is looping back (shown by A in FIG. 15). Therefore, frame f2 may reach earlier than frame f1 (shown by point P in FIG. 15). Then frames f2, f1, and f3 will be output to oHW#87 in that order. And then frames f2, f1, and f3 will loop back at position Lpb2 in that order and be also output from oHW#7 in that order.

As described above, if a multicast tree changes for some reason or other in the process of multicasting, the order of frames may become reverse, depending on a congestion state of frames.

Figure 16:
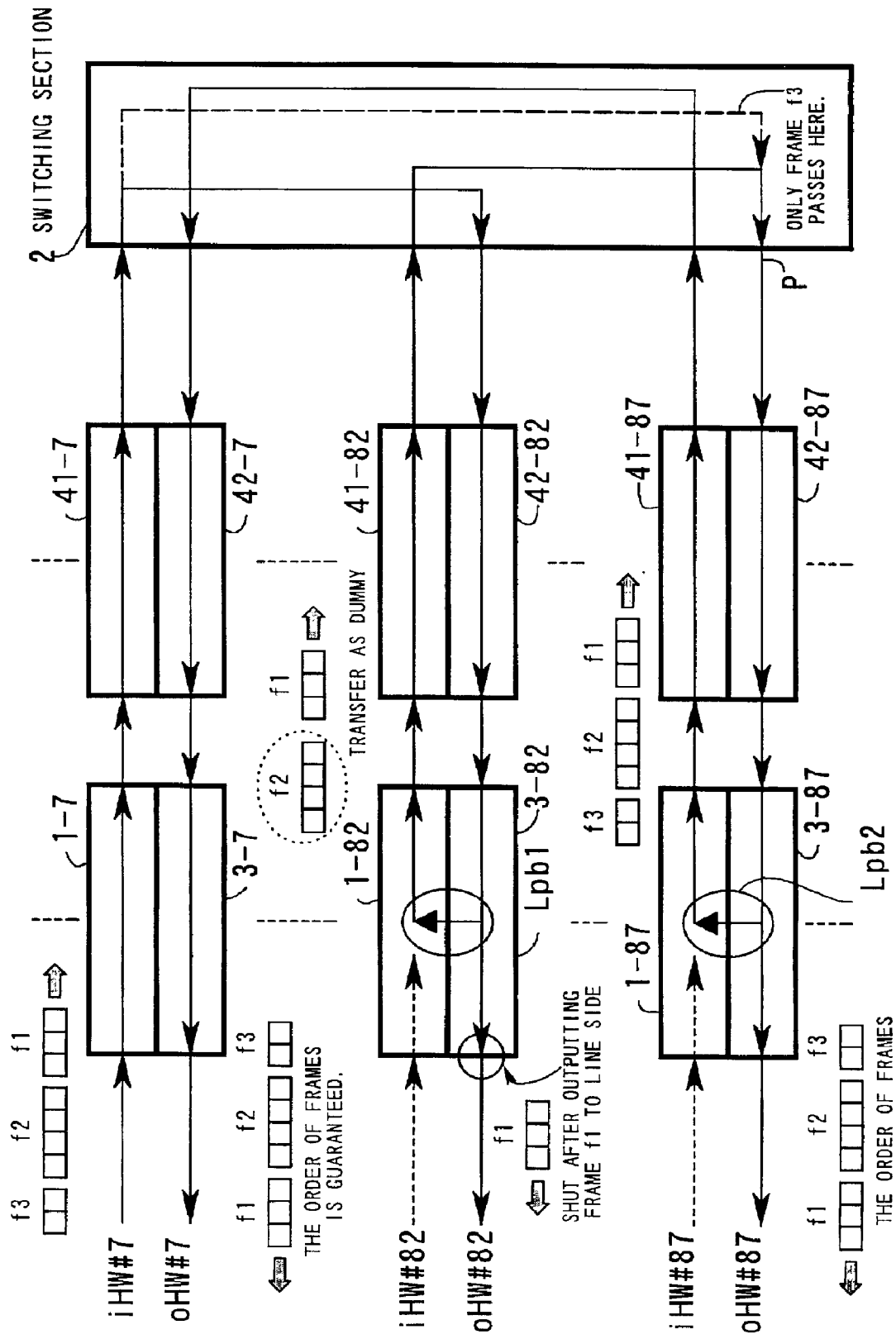
FIG. 16 is a view showing a frame transfer for preventing reversion of the order of frames, according to the present invention.

A frame transfer for preventing reversion of the order of frames according to the present invention will now be described. FIG. 16 is a view showing a frame transfer for preventing reversion of the order of frames according to the present invention. In the multicast tree shown in FIG. 15, it is assumed that after frame f1 loops back at position Lpb1, HW#82 falls off from the multicast. In the present invention, frame f2 which is not output from the line side of HW#82 is transferred to HW#82 as a dummy and loops back at position Lpb1. As a result, frames f1, f2, and f3 will reach point P in that order and reversion of the order of the frames can be prevented.

In other words, if the original multicast information (oHW#82 oHW#87 oHW#7) is replaced immediately by the changed multicast information (oHW#87 oHW#7) when HW#82 falls off from the multicast tree, then reversion of the order of frames, for example, shown in FIG. 15 will occur.

The present invention therefore prevents reversion of the order of frames by controlling a multicast according to the flow of output routes including in the original multicast information for a certain time after a change in multicast tree.

Figure 17:
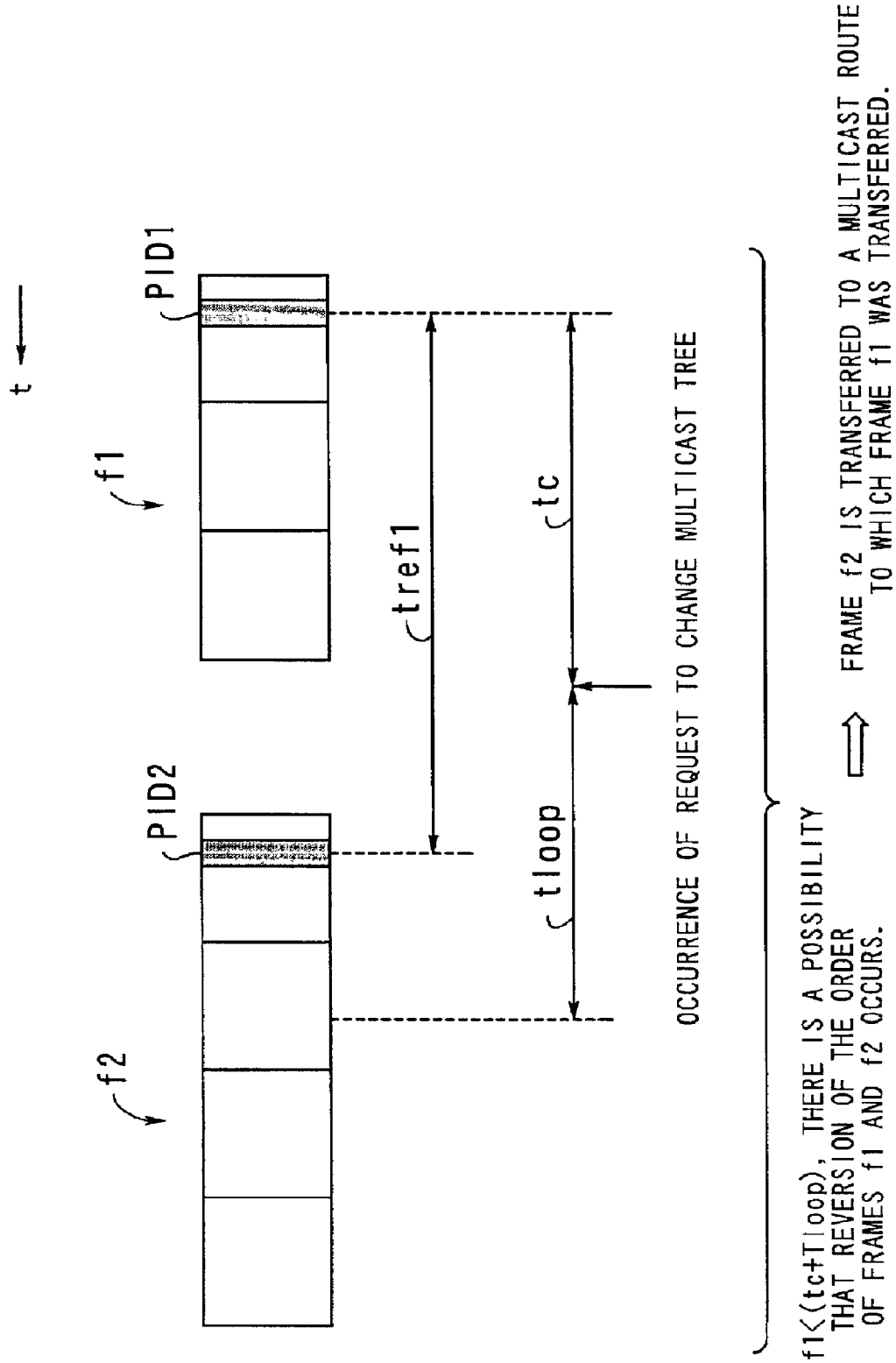
FIG. 17 is a view for describing frame order guarantee control.
Figure 18:
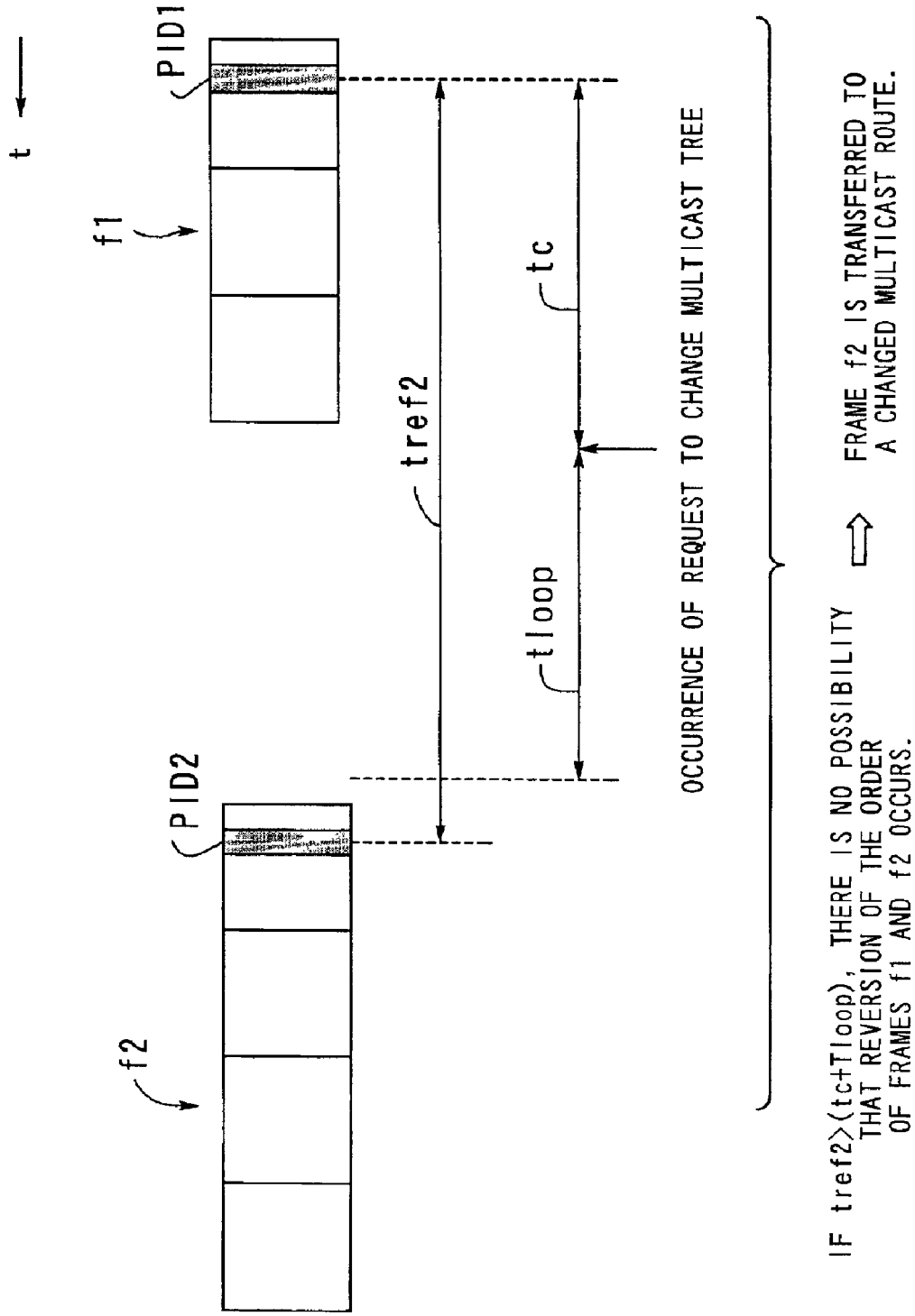
FIG. 18 is a view for describing frame order guarantee control.

Now, frame order guarantee control means according to the present invention will be described on the basis of the above example. FIGS. 17 and 18 are views for describing frame order guarantee control. The state of frames f1 and f2 shown in FIGS. 17 and 18 is that at the time of their reaching iHW#7 of the input line interface section 1-7. In FIG. 17, a burst interval between frames f1 and f2 is short. In FIG. 18, a burst interval between frames f1 and f2 is long.

In this case, multicast route information can be recognized by referring to a PID (packet ID) given to the leading packet of a frame and accessing a table described later with reference to FIG. 19. As a result, after a PID is referred to, routing control of the corresponding frame (multicast control) will be performed.

Therefore, reference interval tref, being an interval between the time when PID1 for frame f1 is referred to and the time when PID2 for frame f2 is referred to, is time from the start of routing control of frame f1 to routing control of frame f2.

In FIG. 17, it is assumed that time tc for a request to change a multicast exists at a position shown and that it takes time tloop for frame f1 to loop back. Then multicast information reference interval tref1 is shorter than time (tc+tloop), so reversion of the order of frames f1 and f2 may occur at point P shown in FIG. 15 (because routing control of frame f2 is performed while frame f1 is cycling).

As shown in FIG. 18, on the other hand, if multicast information reference interval tref2 is longer than time (tc+tloop), reversion of the order of frames f1 and f2 will not occur at point P shown in FIG. 15 (because routing control of frame f2 is performed after frame f1 cycles).

Therefore, if there is a request to change a multicast tree after PID1 for frame f1 is referred to, time tref and time (tc+tloop) are compared. If tref<(tc+tloop), frame f2 is multicasted not to oHW#87 oHW#7 (changed multicast information) but to oHW#82 oHW#87 oHW#7, to which frame f1 was multicasted (that is to say, the old multicast information in which a change is not made is applied). On the other hand, if tref>(tc+tloop), frame f2 is multicasted to oHW#82 oHW#87 oHW#7 (that is to say, new multicast information in which a change has been made is applied).

A general expression which represents a condition for calculating time will now be described. This expression is as follows.

[Numerical Expression 1]

$$tref > (tc + K \times tloop) \qquad (1)$$

where tref is a multicast information reference interval; tc is time for a request to change a multicast; K is the number of lines reduced, that is to say, the number of lines which fall off from the original multicast tree (in the above example, only HW#82 fell off, so K=1); and tloop is loopback time per line.

If the above expression is not satisfied, there is a possibility that reversion of the order of frames occurs. Therefore, a frame which is multicasted after a multicast tree is changed is controlled so that it will follow the flow of output routes specified in the original multicast information. If expression (1) is satisfied, there is no possibility that reversion of the order of frames occurs. Therefore, a frame which is multicasted after a multicast tree is changed is controlled on the basis of changed multicast information.

An expression for calculating time tloop is as follows.

[Numerical Expression 2]

$$tloop = D1 + (D2/D3) \qquad (2)$$

where D1 is a value obtained by cumulating fixed delay time in each of components (such as the input line interface section 1, the switching section 2, the output line interface section 3) in the case of signal propagation, D2 is the maximum size of a frame which remains in a buffer (for the worst case), and D3 is a rate at which an appropriate frame is read from a buffer.

FIG. 19 is a view showing a time management table and time setting register. A time management table T3 includes Multicast Target Line Flag T3a, Last PID Reference Time T3b, Request Time for Multicast Change T3c, Number of Reduced Lines T3d, and Multicast Tree Falling off Target Line Flag T3e. The time management table T3 includes these pieces of information for each PID.

Multicast Target Line Flag T3a is bit map information composed of flags showing lines to which a frame should be multicasted. Last PID Reference Time T3b indicates the time when a PID for the last frame was referred to. If time management for, for example, frame f2 is performed, the time when PID1 for frame f1 was referred to will be shown in this field. Request Time for Multicast Change T3c is the above tc, being time for a request to change a multicast. Number of Reduced Lines T3d is the above K, being the number of lines which fall off from a multicast. Multicast Tree Falling off Target Line Flag T3e is bit map information composed of flags showing lines which fall off from a multicast.

A current time setting register R1 is a register for storing a value, which a timer in an apparatus counts in a constant cycle, as time. This value will be used as PID Reference Time and Request Time for Multicast Change. A time setting register R2 is a register for storing the value of the above tloop, being loopback time per line.

Here these values in the time management table T3 are used to consider the above example. multicast information reference interval tref for frames f1 and f2 is 5000 (=5000−0), which is obtained by subtracting the value of Last PID Reference Time T3$b$ from a value shown by the current time setting register R1. Time for a request to change a multicast tc is 10. Number of lines reduced K is 1. Loopback time per line tloop is 4996, which is shown by the time setting register R2.

As a result, 5000<10+1×4996(=5006) and Expression 1 is not satisfied. Therefore, there is a possibility that reversion of the order of frames occurs, and routing control of frame f2 will be performed so that it follows the flow of output routes specified in the original multicast information (in this example, frame f2 will be transferred to HW#82 as a dummy).

In the above example, frames f1, f2, and f3 input from the line side in that order are output in the order of frames f2, f1, and f3 at the time of a multicast tree being changed. That is to say, a method for preventing reversion of the order of frames f1 and f2 has been described. Frames f1, f2, and f3, however, may be output in the order of frames f2, f3, and f1, depending on the state of frame congestion. Even in such a case, reversion of the order of frames can be prevented in the same way by performing frame order guarantee control according to the present invention on frames f1, f2, and f3.

In the above description, a frame as a dummy is transferred if the condition shown by Expression 1 is not satisfied. This needs a band resource in the switching section 2. On the other hand, another embodiment in which a request to change a multicast tree from upper software is accepted only in the case of the condition shown by Expression 1 being satisfied is possible. This embodiment does not need a dummy frame and therefore a band resource in a switch. In this case, however, information regarding a request to change a multicast tree must be held until the condition shown by Expression 1 is satisfied.

Figure 20:
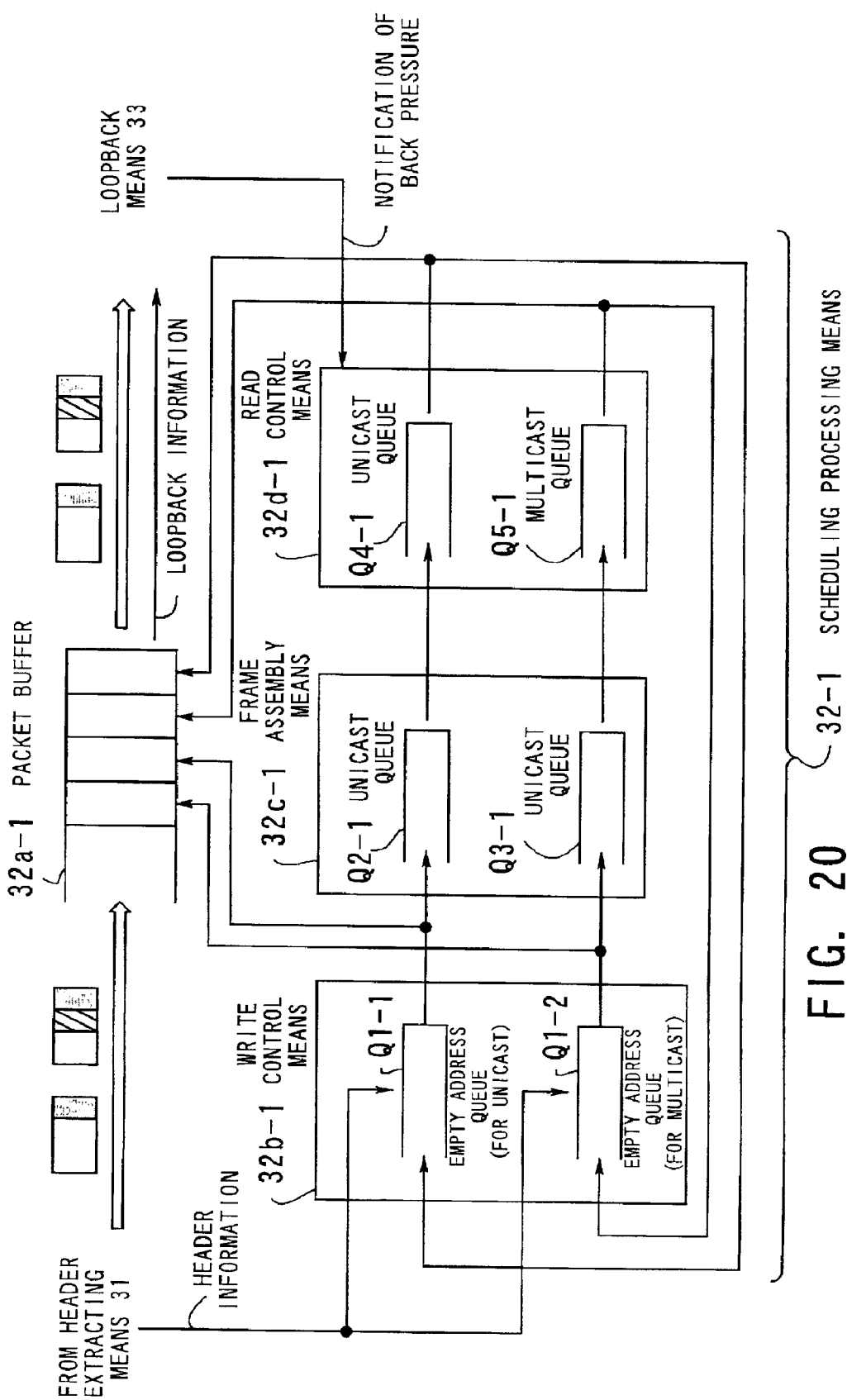
FIG. 20 is a view showing another embodiment of the scheduling processing means.

Now, another embodiment of the scheduling processing means 32 described with reference to FIG. 11 will be described. FIG. 20 is a view showing another embodiment of the scheduling processing means 32. Scheduling processing means 32-1 comprises a packet buffer 32$a$-1, write control means 32$b$-1, frame assembly means 32$c$-1, and read control means 32$d$-1.

The write control means 32$b$-1 includes empty address queues Q1-1 (for unicast) and Q1-2 (for multicast), the frame assembly means 32$c$-1 includes a unicast queue Q2-1 and multicast queue Q3-1, and the read control means 32$d$-1 includes a unicast queue Q4-1 and multicast queue Q5-1.

If a multicast packet is received (if output to lines and a loopback are performed), the write control means 32$b$-1 judges on the basis of header information sent from the header extracting means 31 whether or not a packet can be written to the packet buffer 32$a$-1. If a packet can be written to the packet buffer 32$a$-1, the write control means 32$b$-1 obtains two WAs from the empty address queues Q1-1 and Q1-2 and sends the WAs to the packet buffer 32$a$-1 and frame assembly means 32$c$-1.

The packet buffer 32$a$-1 writes one packet sent from the header extracting means 31 to the two WAs it received.

The frame assembly means 32$c$-1 causes a chain of WAs to be formed in the unicast queue Q2-1 on the basis of the WA the write control means 32$b$-1 obtained from the empty address queue Q1-1. Furthermore, the frame assembly means 32$c$-1 causes a chain of WAs to be formed in the multicast queue Q3-1 on the basis of the WA the write control means 32$b$-1 obtained from the empty address queue Q1-2.

When the queuing of WAs corresponding to one frame is completed, the frame assembly means 32$c$-1 sends assembly information to the unicast queue Q4-1 and multicast queue Q5-1, individually, of the read control means 32$d$-1.

When the unicast queue Q4-1 receives the assembly information, it sends a chain of WAs to the packet buffer 32$a$-1 as an RA. Furthermore, the unicast queue Q4-1 sends this RA to the write control means 32$b$-1 as read information.

On the other hand, when the multicast queue Q5-1 receives the assembly information, it sends a chain of WAs to the packet buffer 32$a$-1 as an RA if there is no notification of back pressure from the loopback means 33. Furthermore, the multicast queue Q5-1 sends this RA to the write control means 32$b$-1 as read information.

The packet buffer 32$a$-1 reads a packet according to the RA it received from the unicast queue Q4-1 and sends the packet and loopback information to the loopback means 33. In addition, the packet buffer 32$a$-1 reads a packet according to the RA it received from the multicast queue Q5-1 and sends the packet and loopback information to the loopback means 33.

When the write control means 32$b$-1 receives the read information, it considers scheduling control of output on the line and loopback sides of packets corresponding to one frame to have been completed and releases a WA corresponding to the RA. Furthermore, the write control means 32$b$ updates chains of WAs in the empty address queues Q1-1 and Q1-2.

As described above, with the scheduling processing means 32-1, being a modification, the unicast and multicast queues are controlled independently of each other. This will lead to a simple process in comparison with the scheduling processing means 32 shown in FIG. 11 in which the unicast and multicast queues are related and controlled. More buffers are necessary, but a process can be performed easily.

Figure 21:
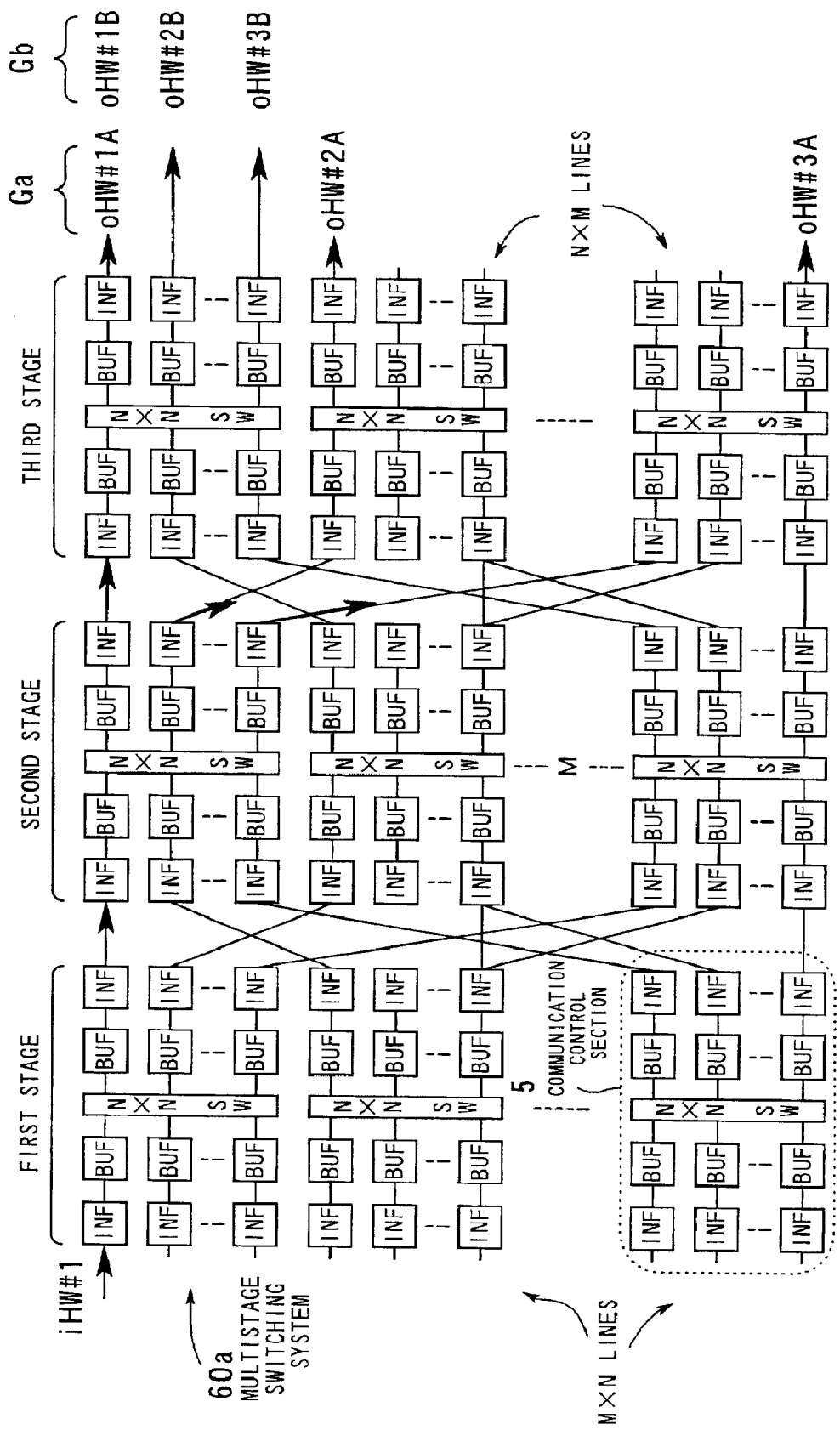
FIG. 21 is a view showing the structure of a multistage switching system.

Now, a multistage switching system formed by the multistage interconnection of the communication systems 5 (communication control sections 5) according to the present invention will be described. FIG. 21 is a view showing the structure of a multistage switching system. In FIG. 21, an INF section corresponds to the input line interface section 1 or the output line interface section 3, a BUF section (buffer section) corresponds to the input buffer 41 or the output buffer 42, and N×N_SW corresponds to the switching section 2 with N input/output lines. This BUF section has the multicast control function.

A multistage switching system 60$a$ is a large-scale switching system in which a plurality of communication control sections 5 are interconnected by transmission media. The multistage switching system 60$a$ in FIG. 21 has a three-stage structure. The number of the communication control sections 5 in each stage is M, so the number of lines in a first stage is M×N and the number of lines in a third stage is N×M.

In INF sections on the input sides of a second and the third stage of the multistage switching system 60$a$ having such a structure, multicast information (including multicast identification information and multicast route information) will be given to a packet each of them received. A multicast packet to which multicast information has been given is switched, is copied to the corresponding outgoing line, and is output.

For example, when a packet input from incoming line iHW#1 is output to outgoing lines oHW#1A, oHW#2A, and oHW#3A of group Ga, multicasting is performed in the second stage and copied packets are output from oHW#1A, oHW#2A, and oHW#3A.

Furthermore, when a packet input from incoming line iHW#1 is output to outgoing lines oHW#1B, oHW#2B, and oHW#3B of group Gb, multicasting is performed in the third stage and copied packets are output from oHW#1B, oHW#2B, and oHW#3B. In this case, there is no need to perform multicasting in the second stage.

Figure 22:
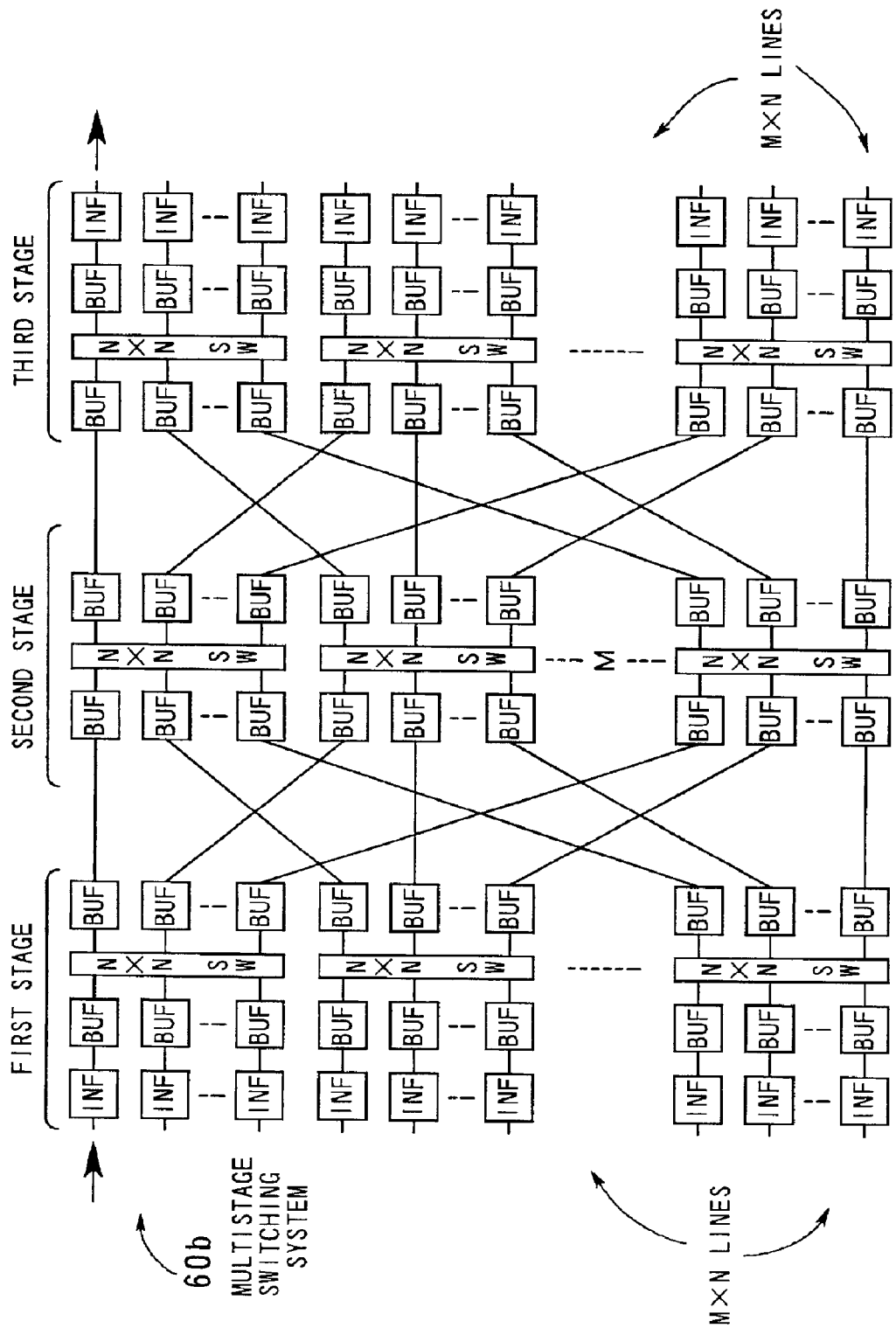
FIG. 22 is a view showing the structure of a modification of the multistage switching system.

A modification of the multistage switching system will now be described. FIG. 22 is a view showing the structure of a modification of the multistage switching system. A multistage switching system 60b has INF sections only on the incoming line and outgoing line sides and has a multi-stage (three-stage, in this example) structure in which switching sections are interconnected via BUF sections.

The multistage switching system 60b performs an INF multicast and BUF multicast. An INF multicast is performed in an INF section and has been described above. A BUF multicast is performed in a BUF section of the multistage switching system 60b.

FIG. 23 is a view showing a multicast setting table. A multicast setting table T4 includes the items according to PIDs of an identifier for indicating whether an INF multicast is performed (UEN), an identifier for indicating whether a BUF multicast is performed (USP), and an identifier for indicating whether a loopback is performed (DEN).

If UEN=1, an INF multicast is performed. If USP=1, a BUF multicast is performed. If DEN=1, a loopback is performed. Information regarding DEN, however, is set for a packet on which a BUF multicast will be performed. The values of these identifiers will be set by instructions from upper software.

Figure 24:
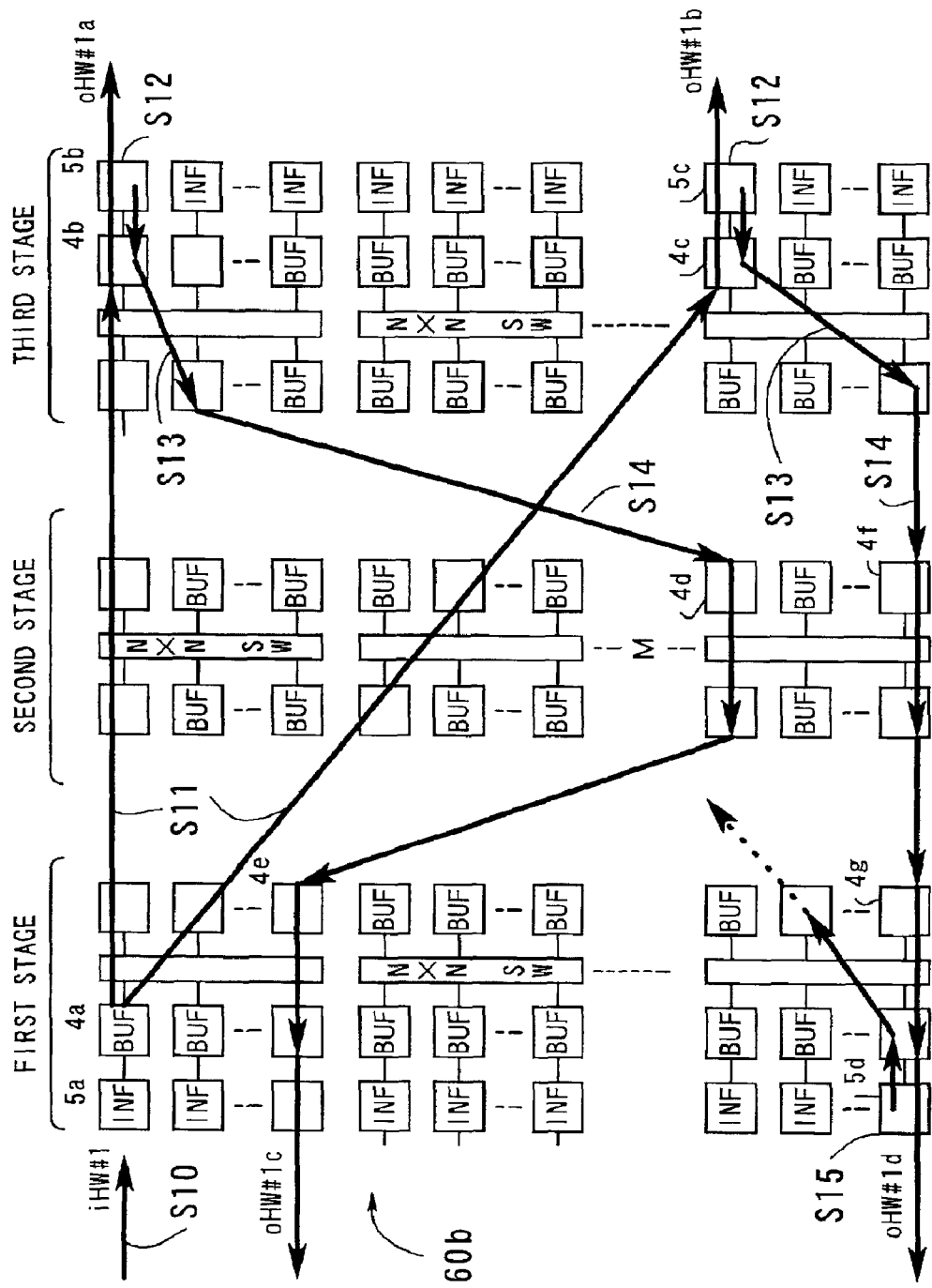
FIG. 24 is a view showing an example of the operation of the multistage switching system.

FIG. 24 is a view showing an example of the operation of the multistage switching system 60b.

[S10] An INF section 5a receives a packet input from incoming line iHW#1. If this packet is one to be multicasted, the INF section 5a refers to the multicast setting table T4 on the basis of a PID for this packet and judges which of INF and BUF multicasts should be performed.

If an INF multicast should be performed (UEN=1), the INF section 5a gives multicast route information and a tag to the packet, gives information showing an INF multicast to the packet as multicast identification information, and transfers the packet.

On the other hand, if a BUF multicast should be performed (USP=1), the INF section 5a simply ensures a free area so that a BUF section 4a can give multicast route information etc. That is to say, the INF section 5a itself does not give multicast route information. Then the INF section 5a gives information showing a BUF multicast to the packet as multicast identification information and transfers the packet.

[S11] The BUF section 4a receives the multicast packet from the INF section 5a. For example, if the BUF section 4a recognizes from the multicast identification information that a BUF multicast should be performed on this packet, then it sets multicast route information for this packet and performs a BUF multicast on the packet (in FIG. 24, the packet is transferred from two routes).

A multicast does not need to be performed at a time in the first stage. It can also be performed dispersedly in the second and third stages. This will prevent the degradation of throughput by copying in each stage.

If the BUF section 4a recognizes from the multicast identification information that an INF multicast should be performed on this packet, then it refers to the tag for the packet, performs switching, and transfers the packet. The BUF section 4a does not copy the packet but treats it as a unicast packet.

[S12] When INF sections 5b and 5c receive the packets transferred from the BUF section 4a, they refer to the multicast identification information and recognize that a BUF multicast was performed on the packets. Then the INF sections 5b and 5c refer to the multicast setting table T4 and judge whether to cause the packets to loop back.

It is assumed that DEN=1. Then the INF sections 5b and 5c output the packets from outgoing lines oHW#1a and oHW#1b respectively and give tags to the packets and cause the packets to loop back (loopback transfer). Moreover, the INF sections 5b and 5c convert the multicast identification information to multicast identification information showing an INF multicast. If DEN=0, then the INF sections 5b and 5c simply output the packets to outgoing lines oHW#1a and oHW#1b respectively. The INF sections 5b and 5c do not cause the packets to loop back.

On the other hand, when the INF sections 5b and 5c receive the packets transferred from the BUF section 4a and recognize from the multicast identification information that an INF multicast was performed on the packets, the INF sections 5b and 5c refer to the multicast route information. If a bit is set at a line other than the lines from which the packets were transferred (that is to say, if a bit is set at a line other than oHW#1a and oHW#1b), the INF sections 5b and 5c give tags to the packets and perform loopback processes (loopback transfers).

[S13] When BUF sections 4b and 4c receive the packets which loop back and recognize from the multicast identification information that an INF multicast was performed on the packets, the BUF sections 4b and 4c give tags to the packets and transfer them. This is the same with a unicast. If the multicast identification information indicates a BUF multicast, the BUF sections 4b and 4c will perform a multicast.

[S14] BUF sections 4d and 4e on one route give tags to the packet they received and transfer the packet. This is the same with a unicast. In this case, the multicast identification information is not used. The packet is output from line oHW#1c.

BUF sections 4f and 4g on the other route give tags to the packet they received and transfer the packet. This is the same with a unicast. In this case, the multicast identification information is not used.

[S15] An INF section 5d performs a process being the same as step S12 on the packet which loops back and outputs the packet from line oHW#1d. Furthermore, the INF section 5d performs a loopback process if a loopback transfer is needed. Then routing control of the packet is performed in the same way.

As described above, a multistage switching system according to the present invention in which the communication control sections 5 are interconnected so as to form a multistage system performs the above routing control. This enables to perform large-scale switching control and multicast control at a high speed.

As has been described in the foregoing, a switching apparatus according to the present invention comprises a matrix switch for performing self-routing on a packet on the basis of a tag including output route information and N-to-one selectors located so as to correspond to N output ports of the matrix switch. This enables high-speed large-capacity routing without a large-scale routing table etc.

Furthermore, with a communication apparatus according to the present invention, on the input line side, a frame is divided into packets, multicast identification information is given, and a tag for a packet is converted; and, on the output line side, a packet loops back, scheduling is performed in the case of a loopback, and packets are combined and output from an appropriate output route. This enables to perform an efficient quality multicast.

Moreover, with a communication system according to the present invention, a switching section comprises a matrix switch for performing self-routing on a packet on the basis of a tag including output route information and N-to-one selectors located so as to correspond to N output ports of the matrix switch; on the input line side, a frame is divided into packets, multicast identification information is given, and a tag for a packet is converted; and, on the output line side, a packet loops back, scheduling is performed in the case of a loopback, and packets are combined and output from an appropriate output route. This enables high-speed large-capacity routing without a large-scale routing table etc. and an efficient quality multicast.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A switching apparatus for routing a packet, the apparatus comprising:
    a matrix switch for performing self-routing on a packet on the basis of a tag including output route information set in the packet; and
    a packet copying section including:
        N-to-one selectors located so as to correspond to N output ports of the matrix switch, and
        setting registers for holding selection information used by the selectors to select a signal.

2. The switching apparatus according to claim 1, wherein Automatic Protection Switching (APS) control or apparatus duplex control for performing the routing and copying of a packet input from one of a first and second systems and for outputting a processed packet from both of the first and second systems is performed.

3. The switching apparatus according to claim 1, wherein Snooping of Outgoing Port (SNOP) control for performing the routing and copying of a packet and for outputting packets not only to an ordinary output route but also to a route to a testing unit is performed.

4. A communication apparatus for performing packet communication, the apparatus comprising:
    an input line interface section including:
        multicast information giving means for dividing a variable-length frame input into a plurality of fixed-length packets and for giving multicast identification information to the effect that a multicast is performed only to a leading packet as multicast information in the case of multicasting the frame,
        packet selecting means for selecting one of a packet from the input line side and a packet which loops back, and
        tag converting means for recognizing the multicast identification information for a selected packet, making a search for an output route, and converting a tag including output route information; and
    an output line interface section including:
        scheduling processing means for performing scheduling to guarantee the continuity of a frame and for writing a packet to and reading a packet from a packet buffer which stores packets,
        loopback means for causing a packet read from the packet buffer to loop back to the input line interface section, and
        packet combining means for combining packets into a frame and outputting the frame from an appropriate output route.

5. A communication system for accommodating many lines and controlling communication, the system comprising:
    an input line interface section including:
        multicast information giving means for dividing a variable-length frame input into a plurality of fixed-length packets and for giving multicast identification information to the effect that a multicast is performed only to a leading packet as multicast information in the case of multicasting the frame,
        packet selecting means for selecting one of a packet from the input line side and a packet which loops back, and
        tag converting means for recognizing the multicast identification information for a selected packet, making a search for an output route, and converting a tag including output route information;
    a switching section including:
        a matrix switch for performing self-routing on a packet on the basis of the tag, and
        a packet copying section including:
            N-to-one selectors located so as to correspond to N output ports of the matrix switch, and
            setting registers for holding selection information used by the selectors to select a signal; and
    an output line interface section including:
        scheduling processing means for performing scheduling to guarantee the continuity of a frame and for writing a packet to and reading a packet from a packet buffer which stores packets output from the switching section,
        loopback means for causing a packet read from the packet buffer to loop back to the input line interface section, and
        packet combining means for combining packets into a frame and outputting the frame from an appropriate output route.

6. The communication system according to claim 5, wherein in the case of recognizing the multicast identification information and making a search for an output route, the tag converting means searches in turn from a line with a number being one higher than that of a line from which a packet was sent and finally searches the line from which the packet was sent.

7. The communication system according to claim 5, wherein the multicast information giving means gives multicast route information showing a route to which a frame should be multicasted only to a leading packet as the multicast information at a multicasting source.

8. The communication system according to claim 7, wherein the multicast information giving means gives codes for error correction in the case of giving the multicast route information.

9. The communication system according to claim 7, wherein the tag converting means converts a tag according to the multicast route information without making a search for an output route in the case of a packet with the multicast route information being transferred.

10. The communication system according to claim 5, wherein the scheduling processing means includes a packet buffer, unicast queues, and multicast queues, further wherein the unicast queues and the multicast queues control a unicast packet and multicast packet in cooperation with each other, share an address in the packet buffer, and performs the scheduling process.

11. The communication system according to claim 10, wherein the scheduling processing means uses read addresses read for loopbacks as write addresses again and forms a chain consisting of the write addresses in a queue.

12. The communication system according to claim 5, wherein the scheduling processing means includes a packet buffer, unicast queues, and multicast queues, further wherein the unicast queues and the multicast queues control a unicast packet and multicast packet independently of each other, use an address in the packet buffer independently of each other, and performs the scheduling process.

13. The communication system according to claim 5, wherein the scheduling processing means performs the scheduling process according to Quality of Service (QOS) class.

14. The communication system according to claim 5, wherein the loopback means includes a memory for storing a packet which should loop back, further wherein in the case of the memory being in a full state, the loopback means sends a signal showing the full state to the scheduling processing means.

15. The communication system according to claim 5, wherein the packet selecting means performs reconciliation control by the frame in the case of selecting one of a packet from the input line side and a packet which loops back.

16. The communication system according to claim 5, further comprising packet transfer stopping means for making corresponding bit information in multicast route information invalid in the case of a failure being detected and for stopping the transfer of packets to a line where the failure occurred.

17. The communication system according to claim 5, wherein the input line interface section further includes frame order guarantee control means for preventing the occurrence of reversion of the order of frames at the time of a request to change a multicast tree, further wherein in the case of the expression $$tref > (tc + K \times tloop)$$

where tref=a multicast information reference interval, being an interval between routing control of two frames, tc=time for a request to change a multicast, K=the number of lines reduced, tloop=loopback time per line, not being satisfied, the frame order guarantee control means performs routing control on the basis of multicast route information before a request to change a multicast by reason of there being a possibility that reversion of the order of frames occurs, and in the case of the expression being satisfied, the frame order guarantee control means performs routing control on the basis of multicast route information after the request to change a multicast.

18. The communication system according to claim 17, wherein the frame order guarantee control means prevents the occurrence of reversion of the order of frames by transferring, in the case of the expression not being satisfied, a frame as a dummy to a line which fell off from the multicast tree as routing control on the basis of multicast route information before a request to change a multicast.

19. The communication system according to claim 17, wherein the frame order guarantee control means prevents the occurrence of reversion of the order of frames by accepting, only in the case of the expression being satisfied, a request to change the multicast tree and performing routing control on the basis of multicast route information after the request to change the multicast tree.

20. A multistage switching system for accommodating many lines and controlling communication, the system comprising:
communication control sections including:
an input line interface section including:
multicast information giving means for dividing a variable-length frame input into a plurality of fixed-length packets and for giving multicast identification information to the effect that a multicast is performed only to a leading packet in the case of multicasting the frame,
packet selecting means for selecting one of a packet from the input line side and a packet which loops back, and
tag converting means for recognizing the multicast identification information for a selected packet, making a search for an output route, and converting a tag including output route information;
a switching section including:
a matrix switch for performing self-routing on a packet on the basis of the tag, and
a packet copying section including:
N-to-one selectors located so as to correspond to N output ports of the matrix switch, and
setting registers for holding selection information used by the selectors to select a signal; and
an output line interface section including:
scheduling processing means for performing scheduling to guarantee the continuity of a frame and for writing a packet to and reading a packet from a packet buffer which stores packets output from the switching section,
loopback means for causing a packet read from the packet buffer to loop back to the input line interface section, and
packet combining means for combining packets into a frame and outputting the frame from an appropriate output route; and
transmission media for connecting the communication control sections so as to form a multistage structure.

21. The multistage switching system according to claim 20, wherein the communication control sections further comprise buffer sections for performing buffering control and multicasting control of a packet before or after switching.

22. The multistage switching system according to claim 21, wherein the communication control sections perform at least one of an Input Line Interface multicast, being a multicast using the input line interface section and the output line interface section, and a Buffer (BUF) multicast, being a multicast using the buffer sections.

* * * * *